US007720286B2

(12) United States Patent
Clary

(10) Patent No.: US 7,720,286 B2
(45) Date of Patent: May 18, 2010

(54) SYSTEM AND METHOD FOR ASSOCIATING HANDWRITTEN INFORMATION WITH ONE OR MORE OBJECTS VIA DISCONTINUOUS REGIONS OF A PRINTED PATTERN

(75) Inventor: Gregory James Clary, Cary, NC (US)

(73) Assignees: Advanced Digital Systems, Inc., Research Triangle Park, NC (US); Cardinal Brands, Inc., Topeka, KS (US)

( * ) Notice: Subject to any disclaimer, the term of this patent is extended or adjusted under 35 U.S.C. 154(b) by 1121 days.

(21) Appl. No.: 11/138,847

(22) Filed: May 25, 2005

(65) Prior Publication Data
US 2006/0267965 A1 Nov. 30, 2006

(51) Int. Cl.
G09G 5/00 (2006.01)
(52) U.S. Cl. ...................... 382/187; 345/179
(58) Field of Classification Search ............... 382/187; 345/179
See application file for complete search history.

(56) References Cited

U.S. PATENT DOCUMENTS

| 4,731,857 | A | 3/1988 | Tappert |
| 4,793,810 | A | 12/1988 | Beasley, Jr. |
| D308,364 | S | 6/1990 | Beasley, Jr. et al. |
| RE33,498 | E | 12/1990 | Proulx et al. |
| 5,008,948 | A | 4/1991 | Tsukawaki |
| 5,060,980 | A | 10/1991 | Johnson et al. |
| 5,063,600 | A | 11/1991 | Norwood |
| 5,113,041 | A | 5/1992 | Blonder et al. |
| 5,187,774 | A | 2/1993 | Ericson |
| 5,243,149 | A | 9/1993 | Comerford et al. |
| 5,247,591 | A | 9/1993 | Baran |
| RE34,476 | E | 12/1993 | Norwood |
| 5,287,417 | A | 2/1994 | Eller et al. |

(Continued)

FOREIGN PATENT DOCUMENTS

WO WO 01/16691 3/2001

(Continued)

OTHER PUBLICATIONS

Website: info@anoto.com; http://www.anoto.com/main.asp, dated Jul. 26, 2000, 16 total pages, Copyright 2000.

(Continued)

Primary Examiner—Aaron W Carter
Assistant Examiner—Stephen R Koziol
(74) Attorney, Agent, or Firm—Alston & Bird LLP

(57) ABSTRACT

A system is provided that includes a pen-enabled computing arrangement having a capture interface and at least one processing element. The capture interface can capture an electronic input defining a stroke through a plurality of concatenated regions. In addition, the handwriting capture interface can also optionally capture an electronic handwriting input based upon a position of the writing stylus with reference to a position-determining pattern. Each of the concatenated regions corresponds to a region of an identification pattern including a plurality of regions that are each associated with a character of an identifier associated with an object. The stroke includes a plurality of portions referenced to respective regions of the identification pattern such that the processing element can determine the identifier based upon the respective regions of the identification pattern, and associate the electronic input with the object associated with the identifier.

38 Claims, 9 Drawing Sheets

U.S. PATENT DOCUMENTS

| | | | |
|---|---|---|---|
| 5,313,527 A | 5/1994 | Guberman et al. | |
| 5,347,477 A | 9/1994 | Lee | |
| 5,392,390 A | 2/1995 | Crozier | |
| 5,455,901 A | 10/1995 | Friend et al. | |
| 5,459,796 A | 10/1995 | Boyer | |
| 5,463,696 A | 10/1995 | Beernink et al. | |
| 5,465,325 A | 11/1995 | Capps et al. | |
| 5,493,692 A | 2/1996 | Theimer et al. | |
| 5,528,154 A | 6/1996 | Leichner et al. | |
| 5,544,295 A | 8/1996 | Capps | |
| 5,544,321 A | 8/1996 | Theimer et al. | |
| 5,555,376 A | 9/1996 | Theimer et al. | |
| 5,559,942 A | 9/1996 | Gough et al. | |
| 5,561,446 A | 10/1996 | Montlick | |
| 5,577,135 A | 11/1996 | Grajski et al. | |
| 5,583,543 A | 12/1996 | Takahashi et al. | |
| 5,587,560 A | 12/1996 | Crooks et al. | |
| 5,596,694 A | 1/1997 | Capps | |
| 5,600,735 A | 2/1997 | Seybold | |
| 5,603,054 A | 2/1997 | Theimer et al. | |
| 5,611,050 A | 3/1997 | Theimer et al. | |
| 5,625,833 A | 4/1997 | Levine et al. | |
| 5,627,349 A | 5/1997 | Shetye et al. | |
| 5,629,499 A | 5/1997 | Flickinger et al. | |
| 5,652,412 A | 7/1997 | Lazzouni et al. | |
| 5,661,506 A | 8/1997 | Lazzouni et al. | |
| 5,666,530 A | 9/1997 | Clark et al. | |
| 5,680,636 A | 10/1997 | Levine et al. | |
| 5,682,439 A | 10/1997 | Beernink et al. | |
| 5,704,029 A | 12/1997 | Wright, Jr. | |
| 5,737,443 A | 4/1998 | Guzik et al. | |
| 5,737,740 A | 4/1998 | Henderson et al. | |
| 5,740,273 A | 4/1998 | Parthasarathy et al. | |
| 5,742,705 A | 4/1998 | Parthasarathy | |
| 5,751,851 A | 5/1998 | Guzik et al. | |
| 5,787,312 A | 7/1998 | Suzuki | |
| 5,797,089 A | 8/1998 | Nguyen | |
| 5,812,865 A | 9/1998 | Theimer et al. | |
| 5,813,771 A | 9/1998 | Ur et al. | |
| 5,818,425 A | 10/1998 | Want et al. | |
| 5,838,819 A | 11/1998 | Ruedisueli et al. | |
| 5,850,214 A | 12/1998 | McNally et al. | |
| 5,898,156 A | 4/1999 | Wilfong | |
| 5,900,943 A | 5/1999 | Owen | |
| 5,903,666 A | 5/1999 | Guzik et al. | |
| 5,921,582 A | 7/1999 | Gusack | |
| 5,930,380 A | 7/1999 | Kashi et al. | |
| 5,943,137 A | 8/1999 | Larson et al. | |
| 5,986,568 A * | 11/1999 | Suzuki et al. | 340/825.52 |
| 6,005,973 A | 12/1999 | Seybold et al. | |
| 6,012,073 A | 1/2000 | Arend et al. | |
| 6,018,591 A | 1/2000 | Hull et al. | |
| 6,050,490 A | 4/2000 | Leichner et al. | |
| 6,055,333 A * | 4/2000 | Guzik et al. | 382/187 |
| 6,055,552 A | 4/2000 | Curry | |
| 6,128,006 A | 10/2000 | Rosenberg et al. | |
| 6,141,570 A | 10/2000 | O'Neill et al. | |
| 6,144,371 A * | 11/2000 | Clary et al. | 345/173 |
| 6,144,764 A | 11/2000 | Yamakawa et al. | |
| 6,151,611 A | 11/2000 | Siegel | |
| 6,153,836 A | 11/2000 | Goszyk | |
| 6,219,731 B1 | 4/2001 | Gutowitz | |
| 6,259,043 B1 * | 7/2001 | Clary et al. | 178/18.01 |
| 6,272,506 B1 | 8/2001 | Bell | |
| 6,295,372 B1 | 9/2001 | Hawkins et al. | |
| 6,304,898 B1 | 10/2001 | Shiigi | |
| 6,311,042 B1 | 10/2001 | DeSchrijver | |
| 6,323,803 B1 | 11/2001 | Jolley et al. | |
| 6,330,976 B1 | 12/2001 | Dymetman et al. | |
| 6,333,994 B1 | 12/2001 | Perrone et al. | |
| 6,374,259 B1 | 4/2002 | Celik | |
| 6,384,848 B1 | 5/2002 | Kojima et al. | |
| 6,396,481 B1 | 5/2002 | Challa et al. | |
| 6,408,178 B1 | 6/2002 | Wickstrom et al. | |
| 6,424,426 B1 | 7/2002 | Henry | |
| 6,431,439 B1 | 8/2002 | Suer et al. | |
| 6,445,468 B1 | 9/2002 | Tsai | |
| 6,456,740 B1 | 9/2002 | Carini et al. | |
| 6,463,413 B1 | 10/2002 | Applebaum et al. | |
| 6,548,768 B1 * | 4/2003 | Pettersson et al. | 178/18.01 |
| 6,553,131 B1 | 4/2003 | Neubauer et al. | |
| 6,564,249 B2 | 5/2003 | Shiigi | |
| 6,592,039 B1 | 7/2003 | Smith et al. | |
| 6,615,183 B1 | 9/2003 | Kolls | |
| 6,622,128 B1 | 9/2003 | Bedell et al. | |
| 6,644,764 B2 | 11/2003 | Stephens, Jr. | |
| 6,651,894 B2 | 11/2003 | Nimura et al. | |
| 6,654,768 B2 | 11/2003 | Celik | |
| 6,655,586 B1 | 12/2003 | Back et al. | |
| 6,663,008 B1 | 12/2003 | Pettersson et al. | |
| 6,671,403 B1 | 12/2003 | Takasu et al. | |
| 6,678,864 B1 | 1/2004 | Tsai | |
| 6,681,045 B1 | 1/2004 | Lapstun et al. | |
| 6,689,966 B2 | 2/2004 | Wiebe | |
| 6,698,660 B2 | 3/2004 | Fahraeus et al. | |
| 6,718,061 B2 | 4/2004 | Lapstun et al. | |
| 6,719,470 B2 | 4/2004 | Berhin | |
| 6,720,985 B1 | 4/2004 | Silverbrook et al. | |
| 6,722,574 B2 | 4/2004 | Skantze et al. | |
| 6,732,927 B2 | 5/2004 | Olsson et al. | |
| 6,741,749 B2 | 5/2004 | Herbert, Jr. | |
| 6,755,129 B2 | 6/2004 | Schneider et al. | |
| 6,798,907 B1 * | 9/2004 | Clary et al. | 382/187 |
| 6,826,551 B1 * | 11/2004 | Clary et al. | 706/46 |
| 6,836,555 B2 * | 12/2004 | Ericson et al. | 382/116 |
| 6,912,308 B2 | 6/2005 | Reintjes et al. | |
| 7,091,959 B1 | 8/2006 | Clary | |
| 7,134,606 B2 * | 11/2006 | Chou | 235/494 |
| 7,231,594 B1 | 6/2007 | Hitchcock et al. | |
| 2001/0016856 A1 | 8/2001 | Tsuji et al. | |
| 2001/0038383 A1 | 11/2001 | Ericson et al. | |
| 2001/0038711 A1 | 11/2001 | Williams et al. | |
| 2002/0011989 A1 | 1/2002 | Ericson et al. | |
| 2002/0044134 A1 | 4/2002 | Ericson et al. | |
| 2002/0050982 A1 | 5/2002 | Ericson | |
| 2002/0056576 A1 | 5/2002 | Ericson | |
| 2002/0059367 A1 | 5/2002 | Romero et al. | |
| 2002/0107885 A1 | 8/2002 | Brooks et al. | |
| 2003/0061188 A1 | 3/2003 | Wiebe et al. | |
| 2003/0066896 A1 | 4/2003 | Pettersson et al. | |
| 2004/0036681 A1 | 2/2004 | Kluttz et al. | |
| 2004/0095337 A1 | 5/2004 | Pettersson et al. | |
| 2004/0113898 A1 | 6/2004 | Pettersson et al. | |
| 2004/0196473 A1 | 10/2004 | Silverbrook et al. | |
| 2004/0201602 A1 | 10/2004 | Mody et al. | |
| 2004/0236741 A1 | 11/2004 | Burstrom et al. | |

FOREIGN PATENT DOCUMENTS

| WO | WO 01/25891 | 4/2001 |
|---|---|---|

OTHER PUBLICATIONS

Website: Ecrio, Inc.; *Welcome to ecrio.com, Ecrio, Inc.* (visited Dec. 21, 2000) <http://www.ecrio.com>, 10 total selected pages.

Website: Ecrio, Inc., *Ecrio White Paper* (visited Dec. 21, 2000) <http://www.ecrio.com/products/p_htm>, 10 total pages.

Website: Ecritek Corp., *About Ecritek Corporation* (visited Jun. 26, 2000) <http://www.ecritek.corn/company/company.html>, 54 total pages.

Website: Anoto AB, *Anoto—join the revolution* (visited Dec. 21, 2000) <http://www.anoto.com>, 29 total selected pages.

Website: Anoto, AB, *Anoton—Home* (visited Jul. 26, 2000) <http://www.anoto.com/main.asp>, 16 total pages.

Anoto, AB, *A comparison of Anoto Technology with Other Relevant Systems*, available at (visited Dec. 21, 2000) <http://www.anoto.com/pressroom/bin/comparison.pdf>, 17 total pages.

Anoto, AB, *Technical Brochure*, available at (visited Dec. 21, 2000) <http://www.anoto.com/pressroom/bin/technical_brochure.pdf>, 16 total pages.

Anoto, AB, *Anoto Pen, available at* (visited Dec. 21, 2000) <http://www.anoto.com/pressroom/bin/anoto_pen.pdf>, 1 total pages.

Anoto, AB, *Applications Illustrations, available at* (visited Dec. 21, 2000) <http://www.anoto.com/pressroom/bin/Applications_illus.pdf>, 1 total page.

Website: Seiko Instruments USA Inc., *Seiko Instruments—Business and Home Office Products Division* (visited Dec. 21, 2000) <http://www.seikosmart.com>, 7 total pages.

Website: Electric Pocket Limited, *BugMe.net: Yellow Stickies for Your Palm OS Handheld!* (visited Dec. 21, 2000) <http://www.bugme.net>, 15 total selected pages.

Electric Pocket Limited, *BugMe! User Guide, available at* (last modified Feb. 13, 2001) <http://www.bugme.net/BugMe.pdf>, 7 total pages.

Electric Pocket Limited, *BugMe! Messenger User Guide, available at* (last modified Feb. 13, 2001) <http://www.bugme.net/BugMeMessenger.pdf>, 8 total pages.

Electric Pocket Limited, *BugMe! For Palm OS* (acquired Dec. 21, 2000), 4 total pages.

Nathan et al., "Real-Time On-Line Unconstrained Handwriting Recognition Using Statistical Methods", 1995 Intl Conference on Acoustics, Speech and Signal Processing, May 1995, vd. 4, pp. 2619-2622.

Nosary et al., "A Step Towards The Use of Writer's Properties For Text Recognition", IEE Third European Workshop on Handwriting Analysis and Recognition, Jul. 1998, pp. 16/1-16/6.

Elliman et al., "The Use of Extended Trigrams For Contextual Word Recognition", IEE Workshop on Handwriting Analysis and Recognition-A European Perspective, May 1996, pp. 10/1-10/.

Downton et al., "Lazy Evaluation for Best-First Contextual Handwriting Recognition", Proceedings of the 5th Intl Conference on Document Analysis and Recognition, Sep. 1999, pp. 589-592.

Amano et al., "DRS: A Workstation-Based Document Recognition System for Text Entry", Computer, Jul. 1992, vol. 25, Iss 7, pp. 67-71.

Du et al., "Computationally Efficient ContextualProcessing for Handwritten Forms", IEE Workshop on Handwriting Analysis an Recognition-A European Perspective, May 1996, pp. 8/1-8/5.

Downton et al., "Visual Programming Paradigms for Handwriting Applications", IEE European Workshop on Handwriting Analysis and Recognition: A European Perspective, Jul. 1994, pp. 21/1-21/8.

Pavlidis et al., "Off-Line Recognition of Signatures Using Revolving Active Deformable Models", 1994 IEEE International Conference on Systems, Man and Cybernetics, Oct. 1994, vol. 1, pp. 771-776.

Kim et al., "Handwritten Word Recognition for Real-Time Applications", Proceedings of the 3rd International Conference on Document Analysis and Recognition, Aug. 1995, vol. 1, pp. 24-27.

Munich et al., "Visual Input for Pen-Based Computers", Proceedings of the 13th Infl Conference on Pattern Recognition, Aug. 1996, vol. 3, pp. 33-37.

Smithies, CPK, "The Handwritten Signature in Pen Computing", IEE Colloquium on handwriting and PenBased Input, 1994, pp. 2/1-2/3.

Beigi et al., "Size Normalizaiton in On-Line Unconstrained Handwriting Recognition", IEEE International Conference on Image Processing, Nov. 1994, vol. 1, pp. 169-173.

Jeremy M. Heiner, Scott E. Hudson, Kenichiro Tanaka; *Linking and Messaging from Real Paper in the Paper PDA*; Proceedings of the 12.sup.th Annual ACM Symposium on User Interface Software and Technology Online!Nov. 1999; pp. 179-186; vol. 1, No. 1; XP002177313; Asheville, North Carolina, USA; Retrived from the Internet: <URL:http://www.acm.org/pubs/citations/proceedings/uist/320719/ p179-heiner> (retrieved on Sep. 6, 2001).

Patent Cooperation Treaty—Notification of Transmittal of the International Search Report or the Declaration; International Searching Authority; regarding PCT / US 01/14009, filed May 1, 2001; mailed Sep. 26, 2001; Application Advanced Digital Systems, Inc.

Matic, N., *Pen-Based Visitor Registration System (PENGUIN)*, IEEE, 1058-6393/95, 1995, pp. 298-302.

\* cited by examiner

114

116

118

Protocol Code | Subject Initials | Subject Number | Visit Date
day month year

Page 1 — 120

160

Informed Consent / Inclusion / Exclusion Criteria
Screening Visit (Study Entry)

Has the patient signed an informed consent? — 122        Yes ○  No ○
— 122                                                     124

Did the subject meet all entry criteria?                  Yes ○  No ○

Mark all bubbles that represent a violation of the inclusion/exclusion criteria:

Inclusion Criteria:

1. ○   2. ○   3. ○   4. ○   5. ○

Exclusion Criteria:

1. ○   2. ○   3. ○   4. ○   5. ○   6. ○   7. ○

174

Comments

FIG. 3.

REPORT OF MEDICAL HISTORY

*— 116*

DATE OF EXAM: 1-22-2002

NOTE: This information is for official and medically confidential use only and will not be released to unauthorized persons

1. NAME OF PATIENT (Last, first, middle): John Doe
2. IDENTIFICATION NUMBER: 6 2 9 9 3 4 5 1 1
3. GRADE: 76
4a. HOME ADDRESS (Street or RFD; City or Town; State; and ZIP Code): 143 West St.
4b. CITY: Raleigh   4c. STATE: NC   4d. ZIP CODE: 27604
5. EXAMINING FACILITY: RDU-001
6. PURPOSE OF EXAMINATION: routine examination

7. STATEMENT OF PATIENT'S PRESENT HEALTH AND MEDICATIONS CURRENTLY USED (Use additional pages if necessary)

| a. PRESENT HEALTH | b. CURRENT MEDICATION | REGULAR OR INTERIM |
|---|---|---|
| good | n/a | |

| c. ALLERGIES (Include insect bites/stings and common foods) | d. HEIGHT | e. WEIGHT |
|---|---|---|
| n/a | 5 FT 10 IN | 170 POUNDS |

8. PATIENT'S OCCUPATION: Software Engineer
9. ARE YOU (Check one): ☒ RIGHT-HANDED  ☐ LEFT-HANDED

10. PAST/CURRENT MEDICAL HISTORY

| CHECK EACH ITEM | YES | NO | DON'T KNOW | CHECK EACH ITEM | YES | NO | DON'T KNOW | CHECK EACH ITEM | YES | NO | DON'T KNOW |
|---|---|---|---|---|---|---|---|---|---|---|---|
| Household contact with anyone with tuberculosis | ○ | ☒ | ○ | Shortness of breath | ○ | ☒ | ○ | Bone, joint, or other deformity | ○ | ☒ | ○ |
| Tuberculosis or positive TB test | ○ | ☒ | ○ | Pain or pressure in chest | ○ | ☒ | ○ | Loss of finger or toe | ○ | ☒ | ○ |
| Blood in sputum or when coughing | ○ | ☒ | ○ | Chronic cough | ○ | ☒ | ○ | Painful or "trick" shoulder or elbow | ○ | ☒ | ○ |
| Excessive bleeding after injury or dental work | ○ | ☒ | ○ | Palpitation or pounding heart | ○ | ☒ | ○ | Recurrent back pain or any back injury | ○ | ☒ | ○ |
| Suicide attempt or plans | ○ | ☒ | ○ | Heart trouble | ○ | ☒ | ○ | "Trick" or locked knee | ○ | ☒ | ○ |
| Sleepwalking | ○ | ☒ | ○ | High or low blood pressure | ○ | ☒ | ○ | Foot trouble | ○ | ☒ | ○ |
| Wear corrective lenses | ○ | ☒ | ○ | Cramps in your legs | ○ | ☒ | ○ | Nerve injury | ○ | ☒ | ○ |
| Eye surgery to correct vision | ○ | ☒ | ○ | Frequent indigestion | ○ | ☒ | ○ | Paralysis (include infantile) | ○ | ☒ | ○ |
| Lack vision in either eye | ○ | ☒ | ○ | Stomach, liver, or intestinal trouble | ○ | ☒ | ○ | Epilepsy or seizure | ○ | ☒ | ○ |
| Wear a hearing aid | ○ | ☒ | ○ | Gall bladder trouble or gallstones | ○ | ☒ | ○ | Car, train, sea, or air sickness | ○ | ☒ | ○ |
| Stutter or stammer | ○ | ☒ | ○ | Jaundice or hepatitis | ○ | ☒ | ○ | Frequent trouble sleeping | ○ | ☒ | ○ |
| Wear a brace or back support | ○ | ☒ | ○ | Broken bones | ○ | ☒ | ○ | Depression or excessive worry | ○ | ☒ | ○ |
| Scarlet fever | ○ | ☒ | ○ | Adverse reaction to medication | ○ | ☒ | ○ | Loss of memory or amnesia | ○ | ☒ | ○ |
| Rheumatic fever | ○ | ☒ | ○ | Skin diseases | ○ | ☒ | ○ | Nervous trouble of any sort | ○ | ☒ | ○ |
| Swollen or painful joints | ○ | ☒ | ○ | Tumor, growth, cyst, cancer | ○ | ☒ | ○ | Periods of unconsciousness | ○ | ☒ | ○ |
| Frequent or severe headaches | ○ | ☒ | ○ | Hernia | ○ | ☒ | ○ | Parent/sibling with diabetes, cancer, stroke, or heart disease | ○ | ☒ | ○ |
| Dizziness or fainting spells | ○ | ☒ | ○ | Hemorrhoids or rectal disease | ○ | ☒ | ○ | X-ray or other radiation therapy | ○ | ☒ | ○ |
| Eye trouble | ○ | ☒ | ○ | Frequent or painful urination | ○ | ☒ | ○ | Chemotherapy | ○ | ☒ | ○ |
| Hearing loss | ○ | ☒ | ○ | Bed wetting since age 12 | ○ | ☒ | ○ | Asbestos or toxic chemical exposure | ○ | ☒ | ○ |
| Recurrent ear infections | ○ | ☒ | ○ | Kidney stone or blood in urine | ○ | ☒ | ○ | Plate, pin or rod in any bone | ○ | ☒ | ○ |
| Chronic or frequent colds | ○ | ☒ | ○ | Sugar or albumin in urine | ○ | ☒ | ○ | Easy fatigability | ○ | ☒ | ○ |
| Severe tooth or gum trouble | ○ | ☒ | ○ | Sexually transmitted disease | ○ | ☒ | ○ | Been told to cut down or criticized for alcohol abuse | ○ | ☒ | ○ |
| Sinusitis | ○ | ☒ | ○ | Recent gain or loss of weight | ○ | ☒ | ○ | Used illegal substances | ○ | ☒ | ○ |
| Hay Fever or allergic rhinitis | ○ | ☒ | ○ | Eating disorder (anorexia, bulimia, etc.) | ○ | ☒ | ○ | | | | |
| Head injury | ○ | ☒ | ○ | Arthritis, Rheumatism, or Bursitis | ○ | ☒ | ○ | | | | |
| Asthma | ○ | ☒ | ○ | Thyroid trouble or goiter | ○ | ☒ | ○ | | | | |

FIG. 4.

SYSTEM AND METHOD FOR ASSOCIATING HANDWRITTEN INFORMATION WITH ONE OR MORE OBJECTS VIA DISCONTINUOUS REGIONS OF A PRINTED PATTERN

FIELD OF THE INVENTION

The present invention relates generally to the processing of handwritten information and, more particularly, to systems and methods for associating handwritten information with one or more electronic objects such as electronic forms, database records and/or one or more physical objects such as packages.

BACKGROUND OF THE INVENTION

Pen-enabled computing is a relatively recent development wherein a user interfaces with a computing system by way of a writing stylus and writing surface instead of a mouse or a keyboard. The writing surface may comprise, for example, a blank sheet of paper or a preprinted form. The writing stylus, in turn, may comprise a device capable of inputting data (a "handwriting input") into the pen-enabled computing system while providing both a visible, or "written ink," copy of the data on the writing surface and an "electronic" copy of the data within the pen-enabled computing system. Such a writing stylus may comprise, for example, a conventional pen, a conventional pencil, a radio transmitter, a magnetic or electric field device, an optical device, an ultrasound transceiver, or combinations thereof.

Once the electronic copy of the data is entered into the pen-enabled computing system, the data may be stored as an "electronic ink" copy, wherein the handwriting input is captured as written, or as a "text" copy, wherein the handwriting input is captured, recognized, and translated into the corresponding text. In some instances, the pen-enabled computing system may be capable of producing both an electronic ink and a text copy of the handwriting input. Since the writing stylus is generally capable of providing a written ink copy of the handwriting input on the writing surface, the user is automatically provided with a hard copy, or visual feedback, of the entered data. It is understood, however, that a written ink copy of the handwriting input may not be provided in some instances, wherein the handwriting input is only captured and stored in the pen-enabled computing system as an electronic copy. Examples of pen-enabled computing devices include the Tablet PC offered by Microsoft Corporation, as well as any of a number of digital pens enabling Anoto functionality developed by Anoto AB of Lund, Sweden. In this regard, digital pens enabling Anoto functionality include, for example, digital pens offered by Logitech Inc., Nokia Corporation, Hitachi Maxell Ltd. and Sony Ericsson Mobile Communications AB.

Typically, the pen-enabled computing system senses the position and/or movement of the writing stylus with respect to the writing surface, which is stored in the pen-enabled computing system as a series of electronic ink data points constituting the handwriting input. In these systems, the electronic ink data points consist of, or are converted to, sets of Cartesian coordinates representing points along the path of the writing stylus as it moves with respect to the writing surface. The handwriting input is often then desirably used for other purposes. However, for the handwriting input to be subsequently utilized, it is often translated from the user's handwriting to text form. While text translation schemes may facilitate practical uses for the handwritten data, they are often not able to accurately translate the user's handwriting. In addition, translation routines may require additional processing and storage capacity which could be used for other purposes and may add size and cost to the pen-enabled computing system.

Some conventional pen-enabled computing systems have been developed that interact with preprinted forms or other objects to which handwriting input may be associated. These systems typically include a pen-enabled computing device including a writing stylus and a handwriting capture interface, as such may be embodied in a digital pen. The digital pen is capable of cooperating with the preprinted form to permit data input into the various fields of the form to be captured and processed. In addition to one or more pieces of information (e.g., fields of a form), the writing surface of the preprinted form of one typical arrangement includes a preprinted pattern of machine-readable dots or other markings. The writing stylus and handwriting capture interface can then cooperate with one another, and the preprinted pattern, to determine the position of the writing stylus with respect to the writing surface of the preprinted form to thereby detect and capture handwriting input to associate with the preprinted form, and if so desired, further based upon portion(s) of the writing surface receiving handwriting input. Further, in addition to facilitating determination of the position of the writing stylus, the preprinted pattern of one conventional arrangement also permits identification of the nature or identity of the preprinted form, page of a multi-page preprinted form or the like. In this regard, each different preprinted form and/or page of a preprinted form can include a different pattern printed thereon, where the pattern is associated with the form and/or page. Thus, in addition to determining the position of the writing stylus with respect to the writing surface of a preprinted form, the pen-enabled computing system may also identify the form and/or page of the form based upon the preprinted pattern.

Whereas conventional pen-enabled computing systems are adequate in performing a number of different functions with respect to handwriting input, it is typically desirable to improve upon such systems. For example, although a preprinted pattern of dots or other markings may adequately enable identification of a particular preprinted form and/or page of a form, in various instances it may be undesirable to provide unique preprinted patterns for each different form and/or page. In this regard, a printer or other facility for printing such preprinted forms may only be capable of printing a limited number of different patterns during one printing run, thus restricting the number of different forms and/or pages that may be associated therewith. Also, it may be more costly for a printer or other facility to print preprinted forms with an increasing number of different patterns, and correspondingly, for an end user to acquire such preprinted forms.

SUMMARY OF THE INVENTION

In light of the foregoing background, the present invention provides a system and method for capturing an identifier utilizing a capture interface. The system and method of exemplary embodiments of the present invention encode an identifier (e.g., form identifier) associated with an object (e.g., form) within concatenated regions that correspond to regions of an identification pattern, where each such region of the identification pattern is associated with a character of the identifier. Accordingly, the concatenated regions may function in a manner similar to a sequence of vertical bars and spaces of a typical barcode that represent numbers and other symbols of data encoded therein. In this regard, the regions of the identification pattern associated with the characters of the identifier can be determined based upon the concatenated regions, such as by marking through the concatenated regions with a writing stylus to capture electronic input defining a stroke through the concatenated regions. The portions of the stroke extending through the regions are then referenced to the corresponding regions of the identification pattern to thereby enable determining the respective regions of the identification pattern. From the determined regions of the identification pattern, the associated characters can be determined and concatenated to form the identifier. Thus, in much the same manner as the concatenated regions function similar to a barcode, the writing stylus may function in a manner similar to a barcode reader scanning a barcode.

According to one aspect of the present invention, a system is provided for capturing an identifier from an input received by a capture device. In one embodiment, the system includes a pen-enabled computing arrangement having a handwriting capture interface and at least one processing element in communication with the handwriting capture interface. Regardless of its implementation, the capture interface is capable of capturing an electronic input defining a stroke through a plurality of concatenated regions. For example, the capture interface can be capable of capturing an electronic input as the writing stylus marks through the concatenated regions of a printed paper. In addition to capturing the electronic input, the capture interface is also capable of capturing an electronic input based upon a position of the writing stylus with reference to a background pattern. In such instances, the capture interface can be capable of capturing an electronic input based upon a position of the writing stylus with respect to the printed paper, where the printed paper has the background pattern printed thereon.

Each of the concatenated regions through which the stroke extends corresponds to a region of an identification pattern from which a position of a writing stylus is capable of being determined, where the identification pattern comprises a plurality of regions that are each associated with a character of an identifier associated with the object. The stroke includes a plurality of portions through the concatenated regions such that each portion is referenced to a respective region of the identification pattern.

The processing element is capable of determining the identifier based upon the regions of the identification pattern to which portions of the stroke are referenced, and based upon the characters of the identifier associated with the respective regions. More particularly, for example, the processing element can be capable of determining the identifier by determining the regions of the identification pattern to which portions of the stroke are referenced, and determining the characters associated with the determined regions of the identification pattern. Thereafter, the processing element can concatenate the determined characters to form the identifier. Irrespective of how the processing element determines the identifier, however, the processing element is also capable of associating the electronic input with the determined identifier to thereby associate the electronic input with the object associated with the identifier.

The system can also include a first computing arrangement capable of providing the plurality of concatenated regions. In such instances, the concatenated regions can be provided by dividing an identification pattern into a plurality of regions, the identification pattern comprising a pattern of markings from which a position of a writing stylus is capable of being determined, and associating each region with a character. Then, an identifier comprising a plurality of characters is selected, where each character of the identifier is associated with a region of the identification pattern. The regions of the identification pattern associated with the characters of the identifier are concatenated, and thereafter associated with an object to thereby associate the identifier with the object. The concatenated regions associated with the object can then be provided by the first computing arrangement.

According to other aspects of the present invention, a method and computer program product are provided for capturing an identifier from an input received by a capture device.

BRIEF DESCRIPTION OF THE DRAWINGS

Figure 1:
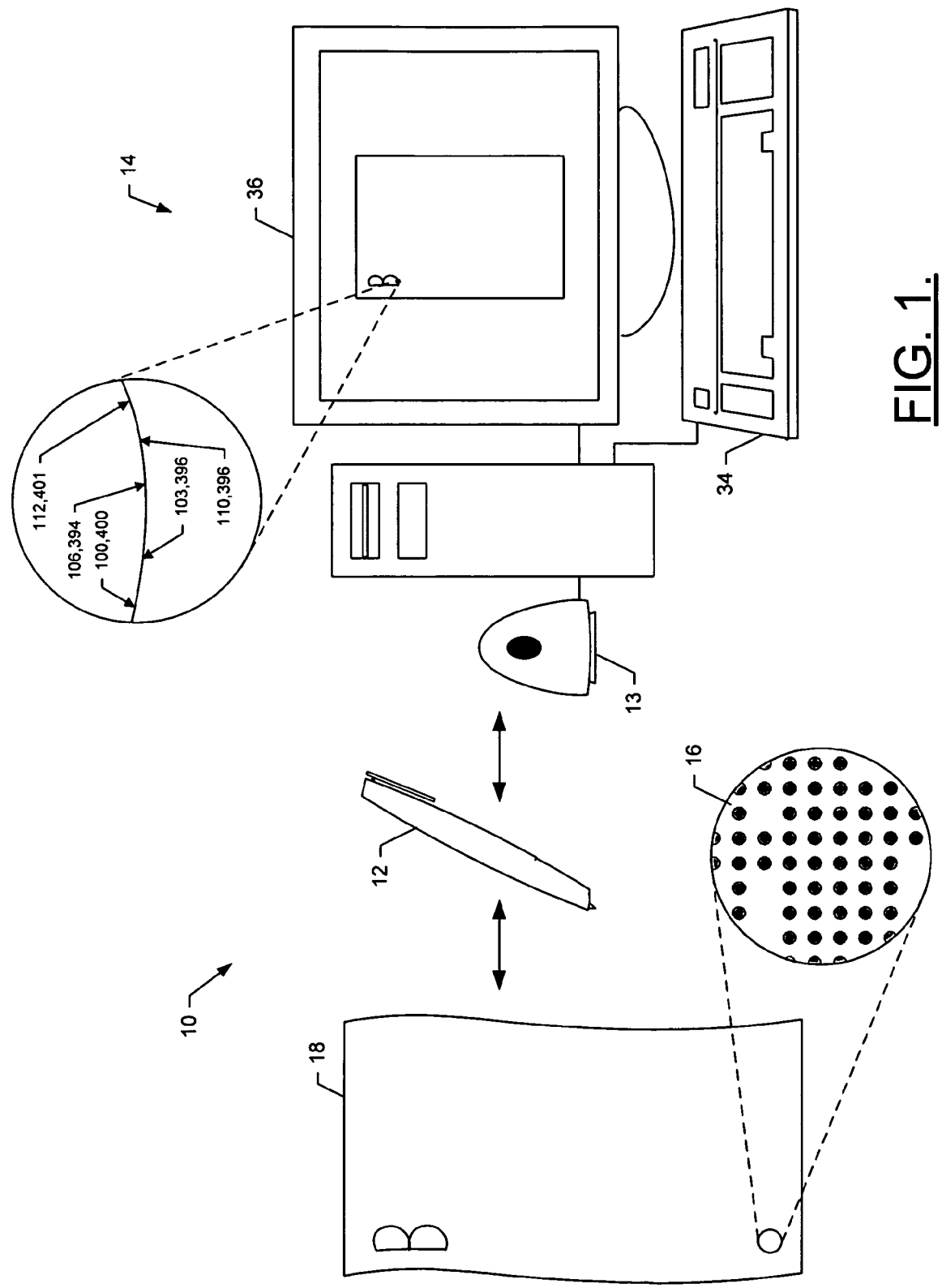
Figure 2:
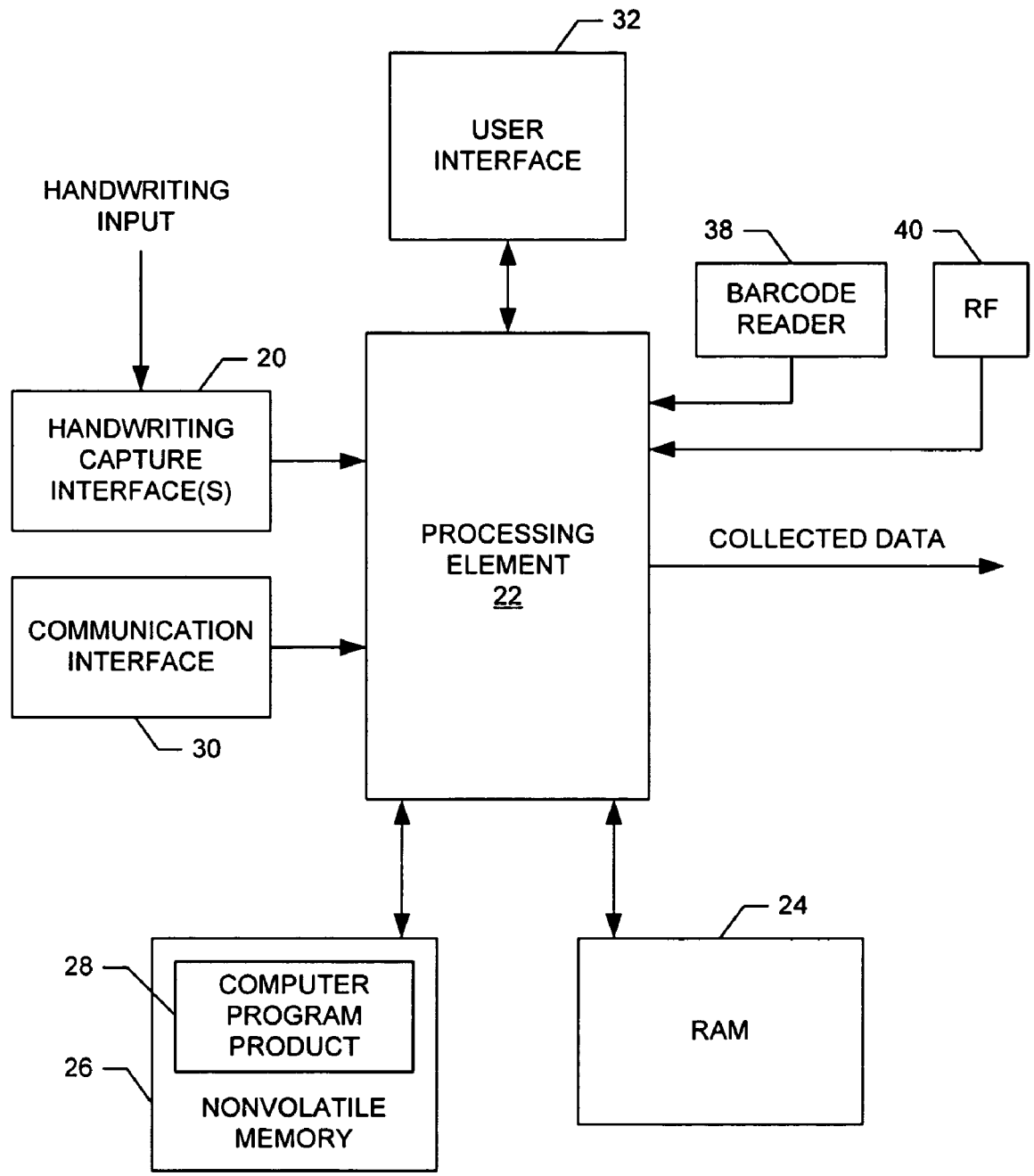
Figure 5:
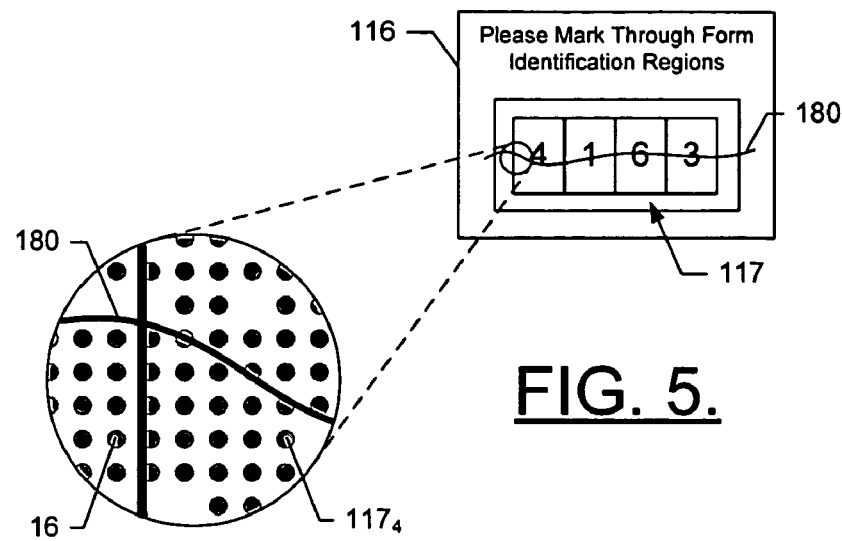
Figure 8:
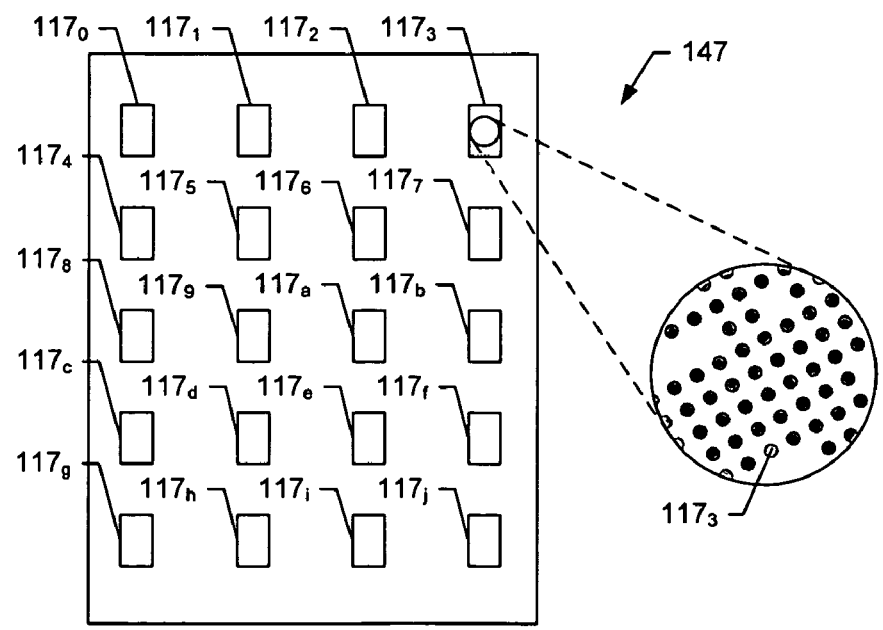
Figure 6:
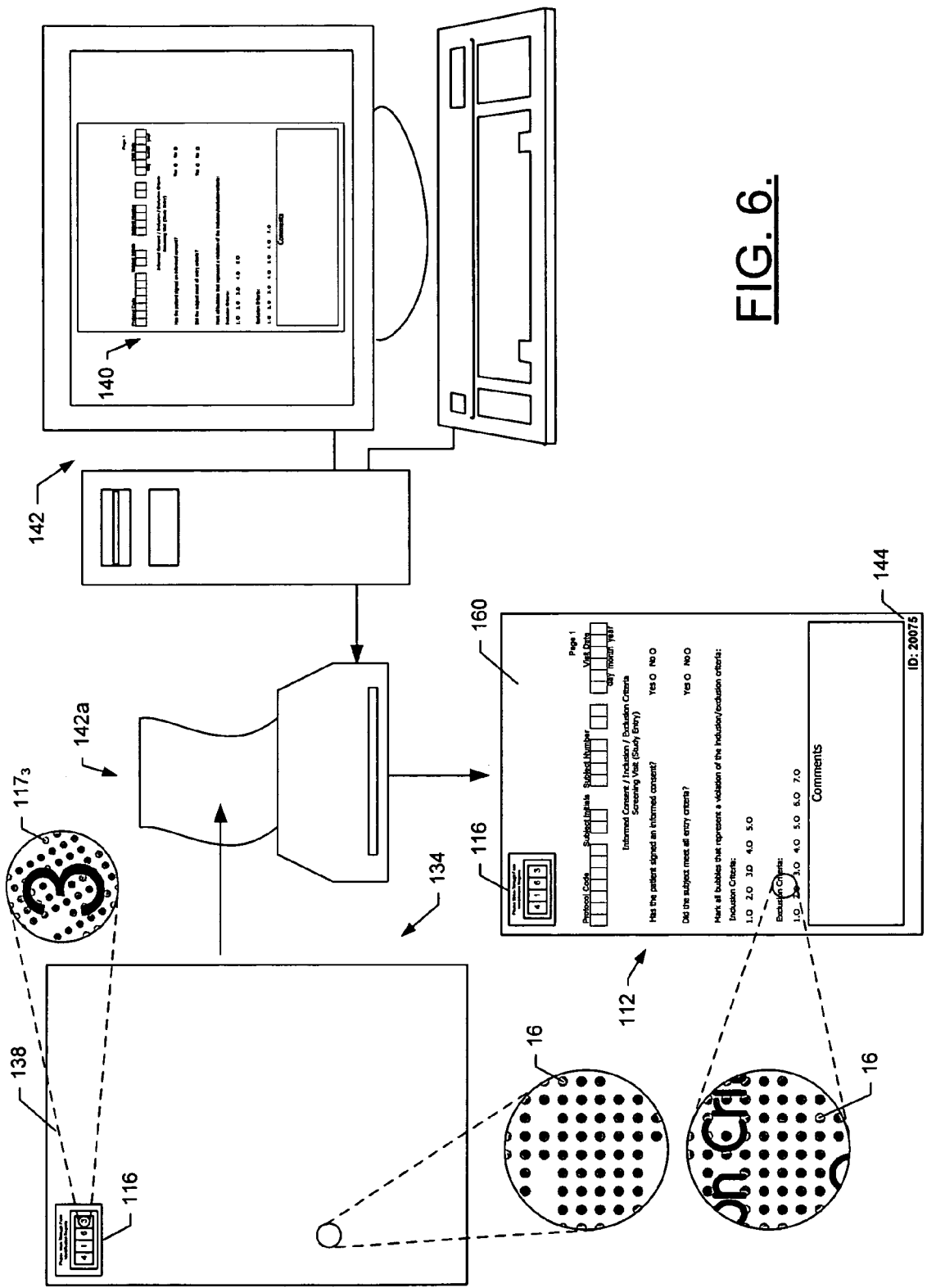
Figure 7:
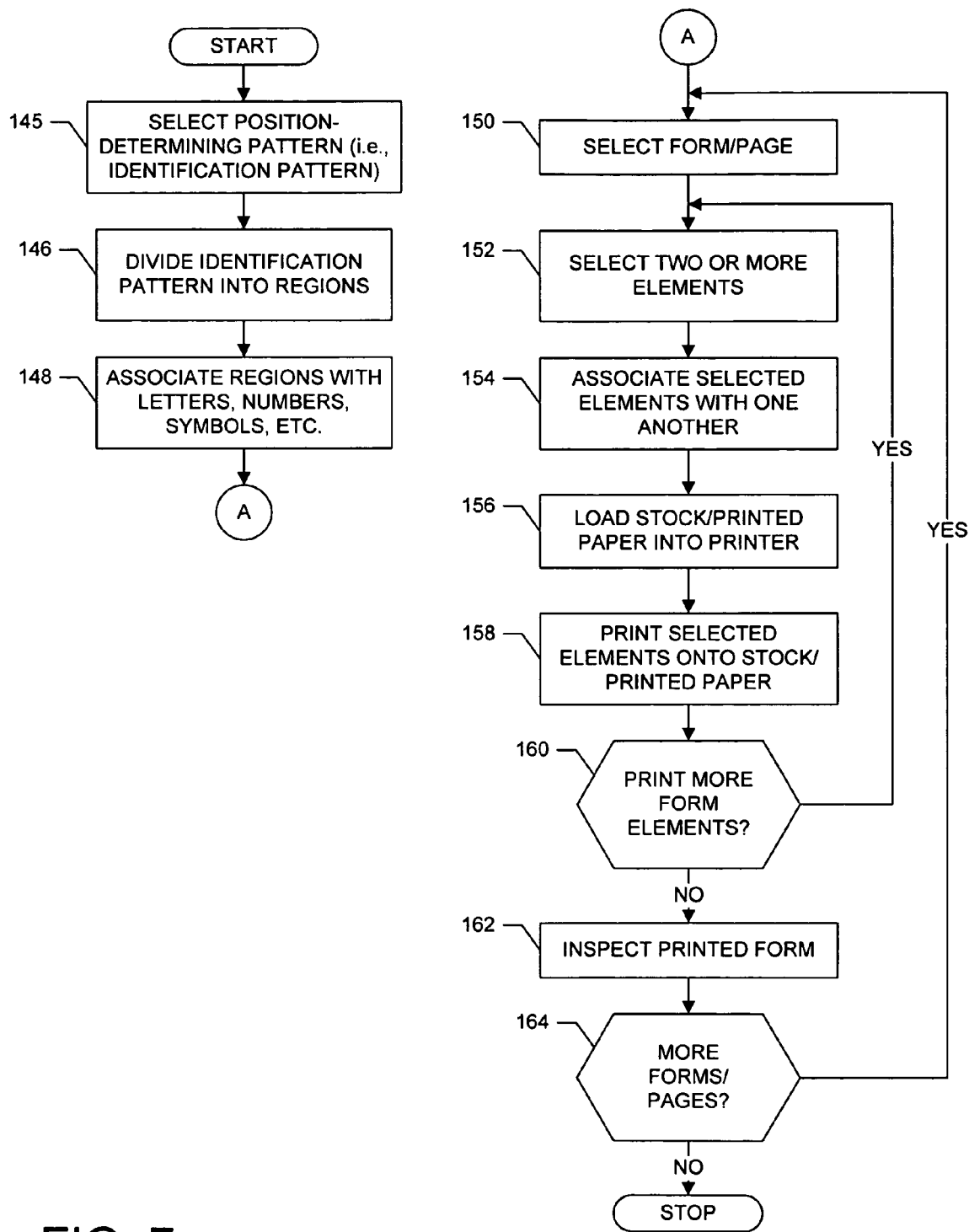
Figure 9:
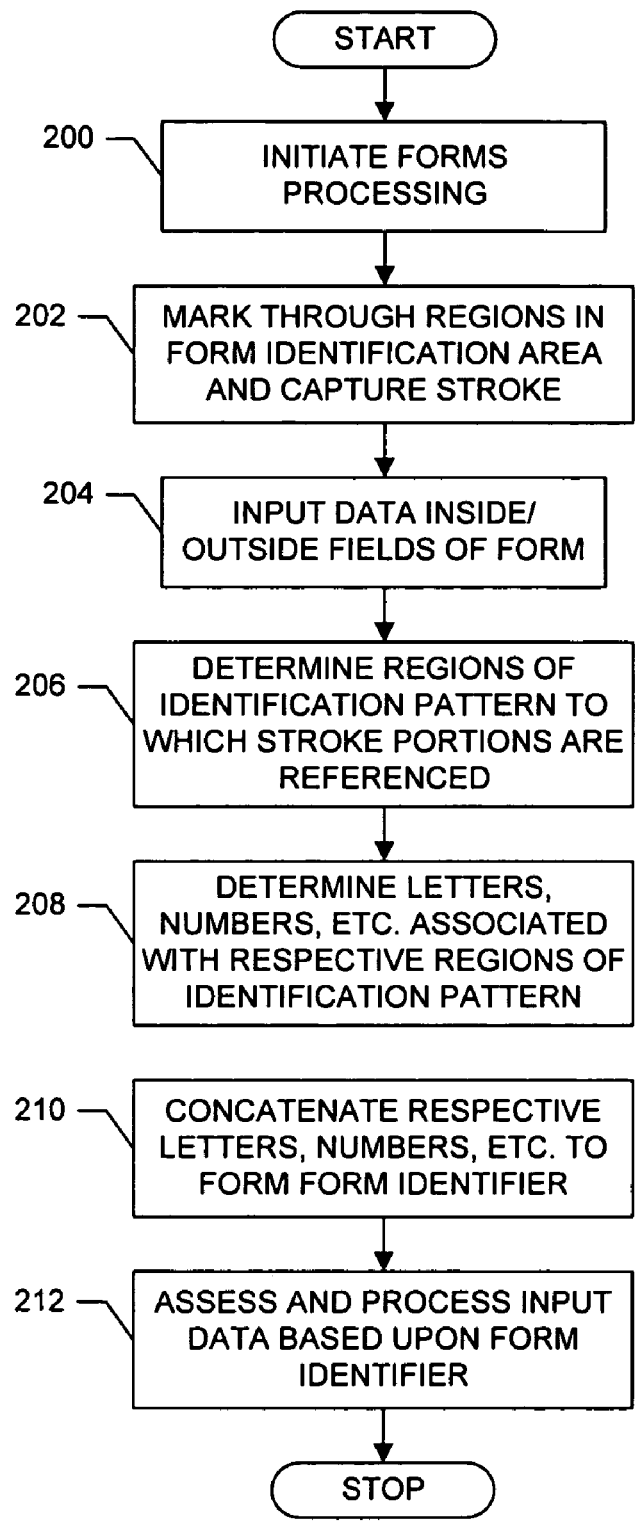
Figures 10A, 10B, 10C:
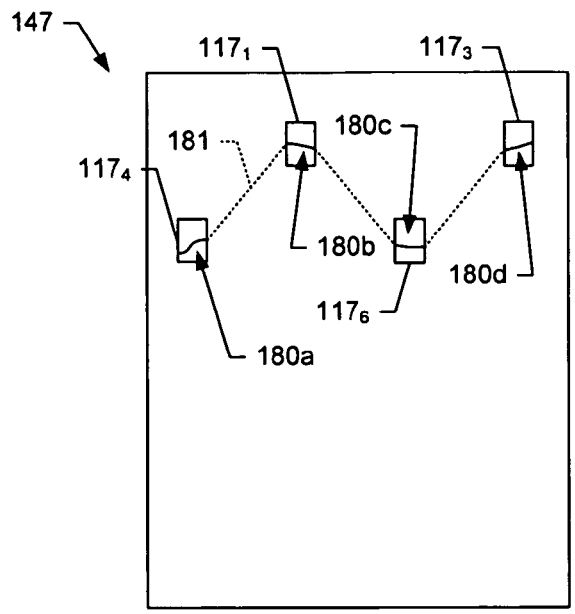

Having thus described the invention in general terms, reference will now be made to the accompanying drawings, which are not necessarily drawn to scale, and wherein:

FIG. 1 is a schematic diagram illustrating the pen-enabled computing device according to one embodiment of the present invention with exploded views illustrating a series of electronic ink data points and a position-encoding dot pattern;

FIG. 2 is a block diagram illustrating some of the components of the pen-enabled computing device according to one advantageous embodiment of the present invention;

FIG. 3 is an example of a medical form in accordance with one embodiment of the present invention;

FIG. 4 is another example of a medical form in accordance with one embodiment of the present invention;

FIG. 5 is a functional block diagram of one means for sensing an identifier associated with a form that may also include a corresponding human-readable version of the identifier, according to one embodiment of the present invention;

FIGS. 6 and 7 illustrate a functional block diagram and flowchart, respectively, of a method of associating a form (i.e., object) with an identifier and providing the form to a user, in accordance with one embodiment of the present invention;

FIG. 8 is a functional block diagram of an identification pattern of dots or other markings divided into a number of regions associated with characters from which an identifier may be formed;

FIG. 9 is a flow diagram illustrating a method of capturing and processing form data by a pen-enabled computing device according to one embodiment of the present invention; and FIGS. 10a, 10b and 10c are functional block diagrams illustrating marking through regions of a form identification area (FIG. 10a), and corresponding portions of a captured stroke referenced to regions of an identification pattern (FIG. 10b) and to portions of a background pattern (FIG. 10c), where the regions of the identification pattern are associated with characters that may form an identifier.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The pen-enabled computing arrangement 10 of exemplary embodiments of the present invention can be embodied in a number of different manners. In one embodiment depicted in FIG. 1, the pen-enabled computing arrangement includes a writing stylus capable of interfacing with one or more computing systems, devices or the like, to capture handwritten information and thereafter process the handwritten information as described hereinbelow. More particularly, in the illustrated embodiment, the writing stylus is embodied by a digital pen 12 which, in turn, is capable of interfacing and communicating with one or more computing systems 14. Examples of such a digital pen include any of a number of digital pens enabling Anoto functionality such as, for example, digital pens offered by Logitech Inc., Nokia Corporation, Hitachi Maxell Ltd. and Sony Ericsson Mobile Communications AB. Examples of such computing systems included stationary computing systems such as personal computers (PC's), server computers or the like, and/or portable or handheld computing systems such as personal digital assistants (PDA's), personal communication systems (PCS's), smart phones, portable (e.g., laptop) computers or the like. As shown and described herein, the digital pen can interface, and thus communicate, with the computing system in any of a number of different wireline and/or wireless manners. For example, the digital pen can be adapted to interface with a cradle 13 which, in turn, is coupled to the computing system by means of a Universal Serial Bus (USB) or RS232 connection. Additionally or alternatively, for example, the digital pen can be adapted to operate in accordance with Bluetooth brand wireless technology developed by the Bluetooth Special Interest Group to thereby interface, and thus communicate, with the computing system.

As explained herein, reference will be made to several "arrangements," including the pen-enabled computing arrangement 10. The term "arrangement" is most commonly used herein to describe an assembly or system including a plurality of components, elements, devices, assemblies, systems or the like, including for example, the digital pen 12 and the computing system 14. It should be understood, however, that the term "arrangement" may more generally refer to a component, element, device, assembly, system or the like, separate from, or included within, an arrangement of a plurality of such components, elements, devices, assemblies, systems or the like. Thus, as used herein, the terms "arrangement," "component," "element," "device," "assembly," "system," and like terms may be used interchangeably without departing from the spirit and scope of the present invention.

Referring now to FIG. 2, a block diagram of an entity capable of operating as a digital pen 12 and/or a computing system 14 is shown in accordance with one embodiment of the present invention. Although shown as separate entities, in some embodiments, one or more entities may support one or more of a digital pen and a computing system, logically separated but co-located within the entit(ies). It should be understood, however, that although the writing stylus is described as being embodied in a digital pen, the pen-enabled computing arrangement 10 need not include a digital pen. In such instances, the pen-enabled computing arrangement can include a writing stylus embodied in any of a number of other manners such that the arrangement is capable of operating in accordance with embodiments of the present invention, as described herein.

As shown, the entity capable of operating as a digital pen 12 and/or a computing system 14 includes one or more capture interfaces 20 that are responsive to the writing stylus for capturing information. As shown and described herein, the capture interface comprises a handwriting capture interface for capturing handwritten information. It should be understood, however, that the capture interface can be adapted to capture information other than handwritten information, without departing from the spirit and scope of the present invention.

When the entity comprises a digital pen 12, for example, the handwriting capture interface 20, in operation with the other components of the digital pen (described below), can be adapted to identify the position of the digital pen by optical, electric or magnetic means or by any other means known to those skilled in the art. As explained herein, the handwriting capture interface may be described as capturing handwriting information. It should be understood, however, that in various instances the handwriting capture interface more particularly captures information from which a processing element 22 of the digital pen determines the handwriting information. Thus, instances where the handwriting capture interface is described as capturing handwriting information may, where appropriate, more particularly refer to the handwriting capture interface capturing information from which the processing element determines the handwriting information.

More particularly, for example, the digital pen can include a digital camera adapted to sense a preprinted pattern 16 of machine-readable dots or other markings (a portion being shown in an exploded inset of FIG. 1) on a writing surface 18, from which a processing element 22 (described below), can determine the position of the digital pen, and thus the writing stylus. The digital camera, in turn, can include one or more infrared light-emitting diodes (LED's) capable of illuminating the writing surface, and a light-sensitive (e.g., CCD, CMOS, etc.) sensor capable of recording a two-dimensional image. In operation, the preprinted pattern absorbs the infrared light emitted by the infrared LED's in a manner that illuminates the pattern to the light-sensitive sensor, which can thereafter record an image based upon the illuminated pattern. For examples of techniques providing such preprinted patterns, see U.S. Pat. No. 6,548,768, entitled: Determination of a Position Code, issued Apr. 15, 2003; and U.S. Pat. No. 6,592,039, entitled: Digital Pen using Interferometry for Relative and Absolute Pen Position, issued Jul. 15, 2003.

Alternatively, for example, when the entity comprises a computing system 14, the handwriting capture interface 20 can include a touch sensitive screen capable of identifying those points on the screen with which one or more objects, such as the writing stylus, a user's appendage (e.g., finger) or the like, comes into contact therewith, and capable of providing signals representative of the coordinates of the respective points on the screen. Additionally or alternatively, when the entity comprises a computing system the handwriting capture interface can include a screen with an electromagnetic digitizer that cooperates with the writing stylus to determine the position of the writing stylus relative to the screen at a plurality of successive instances in time. In another alternative, the handwriting capture interface of a computing system can include an electronic handwriting tablet that cooperates with the writing stylus to determine the position of the writing stylus relative to the electronic handwriting tablet at a plurality of successive instances in time. In such instances, the writing stylus may include a radio transmitter, an ultrasound transceiver or the like for communicating with the electronic handwriting tablet. As such, the electronic handwriting tablet of these embodiments would include a corresponding receiver for detecting the signals indicative of the position of the writing stylus.

In addition to capturing a plurality of "electronic ink" data points defining the position of the writing stylus over time, a written record of the handwritten information may also be created. For example, the digital pen 12 embodying the writing stylus can also include an ink pen, while the writing surface comprises printed paper. In such instances, the ink pen of the digital pen can be adapted to concurrently mark upon the paper while the digital pen creates the plurality of "electronic ink" data points.

Regardless of the manner in which the handwriting capture interface 20 is embodied, the handwriting capture interface captures information from which a series of data points can be determined, typically represented by X, Y coordinate points, representative of the position of the digital pen 12, or more particularly the writing stylus embodied by the digital pen, at a plurality of successive instances in time. The set of coordinate points from the time at which the writing stylus initiates contact with the touch sensitive screen, electronic handwriting tablet or paper to the time at which the writing stylus is lifted from the touch sensitive screen, electronic handwriting tablet or paper defines a writing stroke, a plurality of which typically define the handwritten information that has been entered by the user.

As also shown in FIG. 2, in addition to the handwriting capture interface 20, the entity capable of operating as a digital pen 12 and/or a computing system 14 also includes one or more processing elements 22, such as a central processing unit, and associated memory, such as random access memory (RAM) 24 and a non-volatile storage device 26. The non-volatile storage device, such as, for example, flash memory, an EEPROM or a disk, is typically used for storing and/or executing a computer program product 28 as well as storing useful data such as, for example, electronic ink data, compressed representations of the electronic ink data and/or text representations of handwritten data, as described below. Further, the RAM is generally used for loading and executing the computer program product and for storing various pieces of data during execution of the computer program product. As described below, the computer program product generally cooperates with the processing element to control the operation of the respective entity, as described below in accordance with embodiments of the present invention. It should be understood, however, that even though the computer program product can control the operation of the entity, this control can, instead, be accomplished through various hardware or firmware configurations without departing from the spirit and scope of the present invention. Generally, the computer program product can drive the handwriting capture interface to interface and cooperate with a writing stylus and can subsequently control the processing of the electronic ink data points that have been captured.

In the illustrated embodiment, the handwriting capture interface 20 is a discrete component from the remainder of the entity capable of operating as a digital pen 12 and/or a computing system 14, and is adapted to communicate with the remainder of the respective entity, including the processing element 22, via any conventional communications technique, including a wired connection such as a USB or RS232 connection, and/or a wireless connection such as by means of a Bluetooth interface. In this regard, the entity can include a communication interface 30 for facilitating wireline and/or wireless communication. For example, the entity can include an antenna for facilitating wireless communication, and/or an external device interface for facilitating wired connections. Additionally, although not illustrated, the entity may include a removable storage medium for uploading data to be downloaded by other components. However, the entity can be formed as a single component with the handwriting capture interface, the processing element, the associated memory and any other elements assembled in a single package.

The entity capable of operating as a digital pen 12 and/or a computing system 14 can also include a user interface 32. The user interface includes provisions for facilitating interaction between the respective entity and a user. When the entity comprises a digital pen, for example, the user interface can include a user input interface comprising one or more control buttons, such as for initiating functions within the entity or for providing other types of input. Similarly, when the entity comprises a computing system, the user interface can include a user input interface comprising, for example, a keyboard 34, keypad, mouse or the like. In addition, the computing system can include a display 36 such as, for example, a viewing screen or monitor for allowing the user to view displayed data or status information. Also, the user interface of the computing system may comprise a touch screen or other digitizer that allows the user to input handwriting data directly into the computing system as part of the handwriting capture interface.

In addition to the user input interface, the user interface 32 of the entity capable of operating as a digital pen 12 and/or computing system 14 can include an audio mechanism such as, for example, a buzzer, bell, or other indicator or other devices capable of supporting voice interaction between the entity and the user. Also, for example, a vibration mechanism may also be used as an alert or acknowledgement indicator, particularly when the entity comprises a digital pen. In such instances, the entity is capable of providing aural, vibration and/or visual feedback to the user as the user interacts with the respective entity. Accordingly, the user interface may be implemented in many different manners, combinations thereof, and/or in conjunction with different components of the entity.

The entity capable of operating as a digital pen 12 and/or computing system 14 can also include one or more additional means for sharing and/or obtaining data over a short-range communication link. For example, the entity can include a barcode or other optical reader 38 capable of optically reading or otherwise scanning a machine-readable barcode or the like. Additionally or alternatively, for example, the entity can include a short-range radio frequency (RF) transceiver or interrogator 40 capable of reading machine-readable codes from radio frequency identification (RFID) tags or the like in accordance with RF techniques. As will be appreciated, the means for sharing and/or obtaining data over short-range communication links can be embodied in any of a number of different manners in addition to or in lieu of a barcode reader and RF interrogator, as are well known to those skilled in the art.

According to one embodiment of the present invention, the handwriting input is captured and stored by the handwriting capture interface 20 as a coordinate representation of the movement of the digital pen 12 (writing stylus) relative to a writing surface 18. In accordance with the following description, functions performed by the digital pen may more generally be performed by a writing stylus that may or may not be embodied by the digital pen. Thus, it should be understood that whereas various functions are described as being performed by a digital pen, such functions are more particularly performed by a writing stylus embodied by, or separate from, a digital pen.

More particularly, then, the handwriting capture interface 20 can provide the processing element 22 with a plurality of electronic ink (X,Y) data points representative of the position of the digital pen 12 relative to the writing surface 18 at different points in time. In this context, a stroke is generally defined as a continuous marking by the digital pen beginning with the commencement of contact or other interaction between the digital pen and the writing surface and terminating with the removal of the digital pen from the writing surface. For example, a "c" is generally formed of one stroke, while a "t" is generally formed of two strokes. As illustrated in FIG. 1, for example, a handwritten "B" can be formed of one stroke consisting of many electronic ink data points, the X, Y coordinates of five of which are shown in an exploded inset of FIG. 1.

In addition to or instead of merely accepting free-form handwritten data, the pen-enabled computing arrangement 10 can be adapted to associate user input with one or more objects, entities or the like. For example, the pen-enabled computing arrangement can be adapted to associate user input with one or more physical objects, database records, entries or the like. In this regard, the physical object can comprise any of a number of different objects with which it is desirable to associate user input including, for example, packages, sewer system equipment, medicine bottles or the like. More particularly, when the user input is associated with a physical object, a label, which is printed or produced in accordance with embodiments of the present invention, can be affixed to any portion of the object to provide an identifier of the object to the pen-enabled computing arrangement, as explained below.

Additionally or alternatively, for example, the pen-enabled computing arrangement can be adapted to associate user input with a form, one or more pages of a multi-page form, and/or one or more instances of a form, as such may be embodied by the writing surface 18. As explained below, for example, the pen-enabled computing arrangement can be adapted to associate user input with an instance of a particular traffic citation form issued to a particular offender, an instance of a particular healthcare form for a particular patient, or an instance of a waybill or other form adapted to be tracked. In accordance with embodiments of the present invention, one purpose of the pen-enabled computing arrangement is therefore to identify the object with which the user input is to be associated. For illustrative purposes, the following description depicts the object as a particular preprinted form. It should be understood, however, that the object can comprise any of a number of different types of objects with which user input can be associated, without departing from the spirit and scope of the present invention.

More particularly, for example, the pen-enabled computing arrangement 10 of one embodiment of the present invention is adapted to identify the nature and particular instance of a preprinted form engaged therewith. Several examples of such forms may include a contact list form, a calendar form, a to-do list form, and a general notes form. Other examples of forms include, for instance, a trip planner form, a memorandum form, an educational form, a training form, an insurance form, a traffic citation form, a healthcare form, an expense accounting form, and a wide variety of other forms consistent with the spirit and scope of the present invention. In these embodiments, the computer program product 28 of the digital pen 12 drives the handwriting capture interface 20 thereof to interface and cooperate with blank paper or certain preprinted forms. Additionally or alternatively, the computer program product of the computing system can at least partially drive the handwriting capture interface thereof to interface and cooperate with the digital pen 12 through the blank paper or certain preprinted forms. Note that while reference is made herein to interaction with a preprinted form, such reference is equally applicable to a blank piece of paper or the display 36 of the computing system 14, such as a touch screen or screen in front of an electromagnetic digitizer that serves as a form, in accordance with the spirit and scope of the present invention.

Thus, according to one embodiment of the present invention, the computer program product 28 of the digital pen 12 or computing system 14 enables the pen-enabled computing arrangement 10 to associate user input with a preprinted form (i.e., object) by sensing, for example, a form identifier (i.e., object identifier) associated with a preprinted form. In such instances, the pen-enabled computing arrangement may be adapted to electronically identify the function and physical page of the preprinted form based upon the form identifier. Additionally or alternatively, for example, the pen-enabled computing arrangement may be adapted to provide the identifier as part of a database record or as a database key or to a database management system. In such instances, the identifier may be referred to as a database or record identifier.

The identifier can be embodied in any of a number of different manners that permit the pen-enabled computing arrangement 10 to identify the instance, function and physical page of the form therefrom. As explained below, for example, the identifier may comprise or otherwise be encoded within a plurality of concatenated regions of one or more identification patterns of machine-readable dots or other markings. In such instances, each region represents a portion of the identifier such as an alpha character (uppercase and/or lowercase), numeric character, symbol or the like. As described herein, alpha characters, numeric characters, symbols or the like may generally be referred to as "characters." For other examples of other types of identifiers, see U.S. patent application Ser. No. 11/036,534, entitled: Systems, Methods and Computer Program Product for Associating Handwritten Information with One or More Objects, filed Jan. 14, 2005, the contents of which are hereby incorporated by reference in its entirety.

Accordingly, once the pen-enabled computing arrangement 10 interfaces with and identifies the preprinted form based upon the form identifier, the pen-enabled computing arrangement is able to associate user input with the preprinted form based upon the form identifier. More particularly, the pen-enabled computing arrangement is able to interpret and act upon user input (e.g., handwriting input) entered through input fields associated with the preprinted form. In particularly advantageous embodiments of the present invention, the handwriting input is captured and stored by the computer program product of the digital pen 12 and/or computing system 14 as vector-based data including, in some instances, (X, Y) coordinate pairs, temporal factors, tactile factors, recognized text and/or other descriptive data characterizing the handwriting input in a manner consistent with the spirit and scope of the present invention. In a further example, then, the preprinted form (or page(s) of a preprinted form) can be associated with one or more database records. In such instances, the preprinted form may, but need not, also include pre-existing database information printed thereon, such as a patient's name and address being printed on a preprinted healthcare form for that patient. Accordingly, the handwriting input for the preprinted form may be stored in the respective database record.

As will be appreciated, the form can comprise any of a number of different types of forms. For example, the form could comprise a medical form, such as a screening visit form (see FIG. 5) or a medical history report form (see FIG. 6). As shown in FIG. 3, a particular medical form 112 comprises a writing surface 114, at least one visual caption or other label 122, and a plurality of fields for receiving data via the writing stylus 40, including fields such as for free-form handwriting 174 and/or handwriting for character recognition 118, where such fields may be referred to herein as "text boxes." Additionally or alternatively, the form can include fields for mutually exclusive or inclusive markings such as radio button groups 124. Additionally, the form includes a page identifier 120 for identifying a particular page of a multi-page form. As depicted, for example, the field labeled "Protocol Code" is capable of identifying itself to a user and is expected to receive an input therein with the digital pen 12 corresponding to the code of a particular medical study protocol. In various embodiments, the pen-enabled computing arrangement 10 is capable of identifying the fields and providing feedback to the user as to a selected field via visual and/or audio or speech synthesis, such as by computing system 14 emitting a tone or repeating the field label to the user.

As explained above, the form identifier can be embodied in any of a number of different manners, and as such, the pen-enabled computing arrangement 10 can be operated to sense, identify or otherwise determine the identifier in any of a number of different manners. As described herein, although the pen-enabled computing arrangement may be described as "sensing" an identifier, it should be understood that the term "sense" can be used interchangeably with terms such as "identify," "determine," or the like.

As shown in FIGS. 3 and 4, and more particularly in FIG. 5, for example, the form 112 may include a form-identification area 116 or designated "hot spot" contained within specific sub-area(s) of the preprinted form, where the form identification area may or may not include a human-readable version of the form identifier. In addition to or in lieu of the human-readable form identifier, for example, the form-identification area can include one or more sets of concatenated regions 117 that each uniquely correspond to one or more characters that form at least a portion of the form identifier. In this regard, the form-identification area can include a set of concatenated regions whereby each region uniquely corresponds to a character of the form identifier. Alternatively, the form-identification area can include a number of concatenated sets of regions whereby each set includes a region that uniquely corresponds to a character capable of forming any letter, number or the like of the form identifier. In this manner, the concatenated regions may function in a manner similar to a barcode. More particularly, the concatenated regions that correspond to characters of a form identifier may function in a manner similar to the sequence of vertical bars and spaces of a typical barcode that represent numbers and other symbols of data encoded therein, as explained below.

In a more particular example, the form-identification area can include concatenated regions that correspond to characters of an instance of a particular traffic citation form issued to a particular offender, an instance of a particular healthcare form for a particular patient, or an instance of a waybill or other form adapted to be tracked. In such instances, the instances of the respective forms may constitute pre-existing form identifiers. In other instances, the form-identification area may include more than one set of concatenated regions that each correspond to alternative identifiers. For example, the form-identification area of a particular inspection form for multiple sites of an organization may include a set of concatenated region identifying each of the sites. Thus, the site for which information is captured or otherwise input may be selected based upon the respective set of concatenated regions.

As also shown in FIG. 5, each region corresponding to a character of the form identifier can include a predefined pattern of dots or other marks printed therein. Each predefined pattern is uniquely associated with a respective character. Thus, for identifiers that may include different combinations of numbers 0-9, a unique predefined pattern may be associated with each number for a total of ten different predefined patterns. Thus, the respective form identifier can be encoded by concatenating a set of regions including predefined patterns associated with the characters of the identifier. The predefined patterns may be in addition to or in lieu of any background pattern 16 (see FIG. 1) preprinted on the form 112 for determining a position of the digital pen 12 with reference to the form. Thus, for example, the form can include a background pattern printed on the form, and one or more sets of regions including predefined patterns in the form identification area 116.

As will be appreciated, an object (e.g., form) can include a number of different form elements that are associated with one another, such as one or more identifiers and information relating to the object itself. For example, a form can include a form identifier (including concatenated regions corresponding to the form identifier), and an electronic form definition, such as an XML definition and/or an image representation of a form. The form definition can include, for example, field locations with X and Y coordinates, field identifiers such as questions to be presented to the user, feedback specifications for visual, vibration and/or aural feedback, and constraints for character recognition. In addition to a form identifier and an electronic form definition, a form can include a form element comprising a background pattern 16 of machine-readable dots or other markings from which the position of a writing stylus may be determined. Further, a form can include one or more form elements comprising a number of other pieces of information related to the form such as, for example, information associated with fields of the form.

The form (i.e., object) including its associated form elements can be generated, and thereafter provided to or otherwise received by the user, and thus the pen-enabled computing arrangement 10, in any of a number of different manners. Reference is now made to FIGS. 6 and 7, which illustrate a functional block diagram and flowchart of various steps in a method of generating a form (i.e., object), and providing the form to a user, in accordance with one embodiment of the present invention. As shown and described below, the form can be generated and provided to the user by any of a number of different entities. For example, the form can be at least partially generated and provided to the user by a first computing arrangement 142. The first computing arrangement can comprise any of a number of different components, elements, devices, assemblies, systems including, for example, the digital pen 12 and/or computing system 14. Alternatively, for example, the first computing arrangement can comprise a variety of other types of computing systems, devices or the like, such as a server computer, mainframe computer, a personal computer, a laptop computer, a workstation or the like, so long as the first computing arrangement is capable of performing the functions described hereinbelow.

As shown in block 145 of FIG. 7, a method of generating and providing a form includes selecting a position-determining pattern 16 from a set of position-determining patterns, the selected position-determining pattern being selected to function as an identification pattern 147, as shown in FIG. 8. It should be understood that although the selected pattern functions as an identification pattern, the identification pattern includes a pattern of machine-readable dots or other markings from which the position of a writing stylus may be determined in much the same manner as a background pattern. The identification pattern, however, also functions to encode characters that may form an object (e.g., form) identifier, as explained below.

After selecting a position-determining pattern to function as an identification pattern, the identification pattern can be divided into a plurality of regions 117, which may have any of a number of different shapes (e.g., circular, rectangular, triangular, etc.), as shown in block 146. In this regard, the regions may be located at different spatial positions within the identification pattern without overlap, and are typically spatially separate from one another by a threshold distance, where the threshold distance of one embodiment is at least as long or wide as the regions. Each region may be defined in any of a number of different manners. A circular region, for example, may be defined by a radius or diameter, and a set of X, Y coordinates defining the center of the region. A rectangular region, on the other hand, may be defined in any of a number of different manners that identify or otherwise render determinable each corner of the region, such as by defining four sets of X, Y coordinates for the four corners of the region. Alternatively, a rectangular region may be defined by one set of X, Y coordinates for one corner (e.g., lower left), and a height and a width.

Irrespective of how the identification pattern 147 is divided into a plurality of regions 117, each region includes a portion of the position-determining pattern 16 of machine-readable dots or other markings of the identification pattern that uniquely identifies the position of the respective pattern in the identification pattern. Thus, after dividing the identification pattern into a plurality of regions, each region can be associated with a character, as shown in block 148. As shown in FIG. 8 for a number of rectangular regions, the regions can be associated with numbers 0-9 (i.e., regions $117_0$-$117_9$), and lowercase letters a-j (i.e., regions $117_a$-$117_j$). Although FIG. 8 graphically illustrates an identification pattern including a number of regions associated with numbers and letters, it should be understood that the pattern, regions and associated numbers, letters or the like may be, and typically is, stored in electronic form by a computing arrangement (e.g., first computing arrangement 142).

Before, after and/or as the identification pattern 147 is selected and divided into regions 117 that are associated with characters, a form is selected, as shown in block 150 of FIG. 7. The form can comprise any of a number of different forms, such as those indicated above, and can include a single page or multiple pages. After selecting the form, two or more form elements to include as part of the form are selected in any of a number of different manners including, for example, by graphical user interface (GUI) means, as shown in block 152. For example, an identifier and a background position-determining pattern 16 of dots or other markings can be selected, where the identifier is formed of a plurality of characters that are associated with regions of the identification pattern 147. In this regard, the identifiers of various forms and/or various pages of such forms can be assigned or otherwise selected in any of a number of different manners.

The identifiers can include any of a number of different types of characters. For example, a number of identifiers can be assigned in accordance with a consecutive numbering scheme whereby the identifiers include one or more numeric characters that increase or decrease from one identifier to the next in a regular or irregular interval, such as 12345, 12346, 12347, 12348, 12349 and 12350. Additionally or alternatively, a number of identifiers can be selected in accordance with a "book and set" numbering scheme whereby the identifiers include one or more numeric characters that identify a particular unit (e.g., book) and one or more sub-units (e.g., sets, sections, etc.) within the respective unit, such as 1001-01, 1001-02, 1001-03 and 1001-04.

In addition to or in lieu of a consecutive numbering scheme and/or a book and set numbering scheme, a number of identifiers can be selected to include a check digit, such as in accordance with a weighted and/or unweighted check-digit or modulus (MOD) numbering scheme (e.g., MOD 7, MOD 9, MOD 10, MOD 11, etc.). Advantageously, by selecting including such a check digit, the other digits of the identifier can be verified. For more information on such MOD numbering schemes, see the aforementioned U.S. patent application Ser. No. 11/036,534. In addition to a check digit, one or more identifiers can be selected to include a start value and/or end value, such as for providing additional verification of the identifier.

In addition to the base characters of the identifiers, one or more of the identifiers can further include one or more additional components such as prefixes and/or suffixes. In this regard, the prefixes and/or suffixes can be appended to base characters to include further useful information, such as information related to one or more of the identifier, form, page of the form, creator of the form, user of the first computing arrangement 412, user of the pen-enabled computing arrangement 10, or the like. For example, a number of identifiers can include a prefix and/or suffix representing a month and/or year of creating the respective form, such as "Ja 12345" or "01 12345" ("Ja" and "01" alternatively representing the month of January). Additionally or alternatively, for example, a number of identifiers can include a prefix and/or suffix representing a state, region and/or country of intended use of the form, such as "NY 1001" ("NY" representing the state of New York). Further, for example, a number of identifiers can include a prefix and/or suffix representing an intended user or group of users of the form, such as "GC 20075" ("GC" representing one or more intended users of the form).

Irrespective of exactly how form elements such as the identifier are selected, the form elements are thereafter associated with one another, as shown in block 148. The association can be made in any of a number of different manners, but in one embodiment, the association is made by means of a lookup table created for the form, or including an entry for the form, where the lookup table identifies the selected form elements as being associated with one another. In such instances, the identifier can be, up to the point of being selected and associated with other form elements, unassociated or otherwise independent of a form. Before, after or as the selected form elements are associated with one another, a piece of stock paper is loaded into a printer 142a coupled to or otherwise associated with the first computing arrangement 142, such as by a user of the first computing arrangement, as shown in block 150. The printer can comprise any one or more of a number of different means for printing in accordance with embodiments of the present invention including, for example, a laser printer, offset press, numbering machine, and/or variable imaging press. As will be appreciated, then, generation of all or portions of the form (i.e., object) can occur in any of a number of different contexts including, for example, commercial printing whereby the first computing arrangement, and thus the printer, is operated or otherwise controlled by a commercial printing entity.

After the stock paper is loaded into the printer, the first computing arrangement 142 can direct the printer 142a to print one or more of the associated form elements, representations of one or more of the associated form elements, and/or information related to one or more of the associated form elements, as shown in block 152. For example, after an identifier and a background pattern 16 of dots or other markings are associated with one another, the first computing arrangement can direct the printer to print the identifier and background pattern onto the stock paper loaded into the printer. The printer can print the identifier in a form identification area 116 in any of a number of different manners. For example, the printer can print the identifier in the form identification area by printing the regions of predefined patterns 117 of the identification pattern 147 that are associated with respective characters of the identifier, where the printer prints the predefined patterns of dots in a machine-readable manner, typically resulting in a pattern invisible or barely visible to the user.

The printer may be configured to print the regions 117 concatenated from left to right (or top to bottom) in the order in which the associated characters are concatenated to form the identifier. More particularly, if the identifier comprises the numeric string "4174," the printer can print predefined regions $117_4$, $117_1$, $117_7$ and $117_4$, concatenated in the order in which the corresponding numbers appear in the identifier. It should be understood, however, that the regions may alternatively be printed from right to left (or bottom to top), if so desired. Irrespective of how the regions are printed, however, if so desired, the printer can also print the identifier in a human-readable format (e.g., text), as shown in FIG. 5.

Also, to enable the digital pen 12 to thereafter determine its position based upon the printed background pattern 16, the printer prints the background pattern of dots in a machine-readable manner, again typically resulting in a background pattern invisible or barely visible to the user. By printing a form identifier in association with, but not encoded within, the same background pattern of dots or other markings, the form identifier and background pattern are decoupled from one another. Thus, in contrast to conventional systems where unique background patterns encode the unique identifiers associated therewith, the first computing arrangement of exemplary embodiments of the present invention can utilize the same background pattern or a small number of background patterns in association with a plurality of, or a larger number of, identifiers, and thus, a plurality of forms/objects or pages of form(s), as explained below.

As indicated above, it may be desirable or otherwise necessary to place the identifier on the form in a manner other than by printing by the printer 142*a*. In such instances, in addition to or in lieu of printing the identifier in a manner capable of being performed by the printer, the identifier may be attached or otherwise affixed to the stock paper in a manner independent of the printer, such as by the user or any of a number of other automatic or manual means. For example, a label having concatenated regions corresponding to the identifier (and the human-readable identifier if so desired) printed thereon can be attached or otherwise affixed to the stock paper before or after printing any other form elements, representations of those elements and/or information related to those form elements. Furthermore, labels having identifiers consisting of concatenated regions can be affixed to physical objects with which the identifiers are associated.

As shown in block 160 and again in block 152, after the printer prints onto the stock paper, two or more form elements to include as part of the form can again be selected, such as by GUI means, if so desired. The selected form elements include at least one form element not otherwise previously selected, but can otherwise include one or more previously selected and associated form element. For example, an electronic form definition can be selected along with a previously selected and associated identifier and background pattern of dots or other markings. As shown in FIG. 6, for example, the exemplary form definition 140 comprises that of the screening visit form 112 of FIG. 3. Again, after selecting two or more form elements, the form elements are associated with one another, as shown in block 154. Before, after or as the selected form elements are associated with one another, the printed paper 138 including the previously printed information is loaded into the printer 142*a*, as shown in FIG. 6 and block 156 of FIG. 7. Alternatively, the selected form elements can be printed at the time of printing the previously selected form elements, after loading stock paper into the printer.

Similar to before, after the printed paper is loaded into the printer 142*a*, the first computing arrangement 142 can direct the printer to print one or more of the associated form elements, representations of one or more of the associated form elements, and/or information related to one or more of the associated form elements, as shown in block 158. Continuing the example shown in FIG. 6, before printing the form definition, a representation of the form definition or information related to the form definition, the first computing device 142 can load or otherwise select the form definition 140. Then, after printing the background pattern 16 and the identifier on the stock paper, and after loading the printed paper 138 into the printer, the first computing arrangement can direct the printer to print visual portions of the form onto the printed paper, including the visual identifiers 122 and fields 174, 118, 120 and 124 (see FIG. 3), as shown in block 152. In addition, the first computing arrangement can direct the printer to simultaneously print, along with the visual portions of the form, a reprint 144 of the form identifier associated with the form, where the reprint is typically in a human-readable format.

Generation of the form can continue by selecting form elements to be included in the form, associating the selected form elements with one another, and printing the associated form elements, representations of one or more of the associated form elements, and/or information related to one or more of the associated form elements. Furthering the above example, generation of the form can continue by further associating information with one or more fields of the form, such as information stored in a database associated with the form. The printed paper 160 including the previously printed background pattern 16, form identifier and visual portions of the form can then be loaded into the printer 142*a*, which the first computing arrangement 142 thereafter directs to print the information within the respective fields of the form. Alternatively, the selected form elements can be printed at the time of printing previously selected form elements, after loading stock paper into the printer. Thus, one or more of the form elements, representations of one or more of the associated form elements, and/or information related to one or more of the associated form elements can be printed upon the stock paper at one or more instances.

After printing one or more form elements, representations of one or more of form elements, and/or information related to one or more form elements of the form onto the stock paper, the resulting printed form 112 can be provided to, and utilized by, a user of a pen-enabled computing arrangement 10, such as in a manner explained herein. Before providing the printed form, however, the printed form can be inspected, such as by a user of the first computing arrangement, or by the first computing arrangement itself, as shown in block 162. For example, the printed form can be inspected to ensure the printing is of sufficient quality and that the form was properly printed in accordance with the respective form definition. In addition, by also printing a reprint 144 of the form identifier, the printed form can be inspected to ensure that the form element(s), representations of form element(s), and/or information related to form element(s) printed on the form are associated with the proper identifier, such as by matching the identifier printed in a form identification area 116 of the stock paper with the reprint, and thus the form elements, associated with the printed form.

Generation of the printed form, or portions thereof, can be performed at one or more instances by one or more computing arrangements coupled to one or more printers (including the first computing arrangement 142 and/or one or more other computing arrangements) for one or more forms and/or one or more pages of one or more forms, as shown in block 164, and again by blocks 150-162. In this regard, each form and/or page of a form typically includes a combination of form elements that differ from those of another form and/or page. For example, a number of different forms and/or pages can each include a unique identifier that is associated with a background pattern 16 of dots or other markings that may be the same for one or more forms and/or pages. In such an instance, each form may include a different form identifier and form definition while including the same background pattern of dots or other markings, if so desired. Whereas a number of different forms and/or pages within one or more forms may include a unique identifier, those same forms and/or pages may include the same background pattern of dots or other markings (or a small number of background patterns of dots or other markings) as one or more other forms and/or pages. Thus, form/object identifiers can be decoupled from background patterns that conventional systems uniquely associate with form identifiers.

Further, one or more of the preceding steps may be performed for groups of forms before others of the steps are performed for one or more of the forms of the group. For example, a number of unique form identifiers can be selected and associated with one or more background patterns 16 of dots or other markings (see blocks 152 and 154). Each unique identifier and associated background pattern can then be printed on a separate piece of stock paper, the pieces of stock paper having previously been loaded into a printer 142a coupled to the first computing arrangement 142 (see blocks 156 and 158). In such an instance, all or at least a portion of the identifiers can be associated with the same background pattern(s). After printing the identifiers and background pattern(s) on the pieces of stock paper, the pieces of printed paper can then be further utilized by the first computing arrangement 142 or provided to one or more other computing arrangements for performing the other steps in generating a preprinted form. For example, the pieces of printed paper can be provided to another computing arrangement that selects one or more forms and/or pages of one or more forms, and associates the form definitions of those selected forms and/or pages with the identifiers/background pattern(s) printed on the paper (see blocks 150, 152 and 154).

The printed pieces of paper including the identifiers/background pattern(s) can be loaded into a printer associated with the other computing arrangement (see block 156). Then, the other computing arrangement can direct the printer to print, on the pieces of printed paper, one or more of the associated form elements, representations of one or more of the associated form elements, and/or information related to one or more of the associated form elements (see block 158). For example, the other computing arrangement can direct the printer to print visual portions of the form onto the printed paper, including the visual identifiers 122 and fields 174, 118, 120 and 124 (see FIG. 3), as well as a reprint 144 of the associated form identifier associated with the form, if so desired. After printing all of the desired form elements, the printed form can be inspected, such as by a user of the other computing arrangement, by the other computing arrangement itself, or by yet another user or computing arrangement (see block 162). Advantageously, the arrangement may keep a record of which identifiers have been reprinted. After the user interacts with the provided paper, and after handwriting, identifier (information relating to concatenated regions corresponding to the identifier), and background pattern information are transferred to a processing element, the user may select via standard graphical user interface means the human-readable identifier corresponding to the paper upon which the user interacted, from the record of reprinted identifiers corresponding to the pattern.

FIG. 9 illustrates a flowchart including various steps in a method of processing a form based on, or producing a contextual electronic message from, an input or inputs to a pen-enabled computing arrangement 10 according to one embodiment of the present invention. As shown in block 200, a user of a pen-enabled computing arrangement 10 may first perform an initiating action to initiate the creation of a contextual electronic message or forms processing by the arrangement. In one embodiment, for example, the user may perform such an initiating action by inputting information into a particular field of a form (e.g., checking a box). Further details of the initiation of a contextual electronic message, according to some embodiments, are found in U.S. Pat. No. 6,826,551, entitled: System, Computer Software Program Product, and Method for Producing a Contextual Electronic Message From an Input to a Pen-Enabled Computing System, issued Nov. 30, 2004, assigned to Advanced Digital Systems, Inc., and hereby incorporated by reference in its entirety.

Before, during or after initiating the creation of a contextual electronic message or forms processing, the user may operate the pen-enabled computing arrangement 10 to identify a desired form for the creation of a contextual electronic message or forms processing. In this regard, the form identity may form at least a part of the context for the contextual electronic message, such as in the case of a waybill for a particular package (e.g., 124535). For example, the user may operate the pen-enabled computing arrangement, or more particularly the digital pen 12, to sense the identifier of the desired form. If so desired, the pen-enabled computing arrangement may prompt the user by audio (tone, voice message, etc.), vibration and/or visual (on display 36) means to thereby direct the user to operate the pen-enabled computing arrangement to identify a desired form, or more particularly, to operate the digital pen 12 to sense the identifier of the desired form. The arrangement may prompt the user at one or more instances before the arrangement senses a form identifier such as, for example, before and/or after the user performs an initiating action to initiate the creation of a contextual electronic message or forms processing. Then, if the user attempts to input data before the pen-enabled computing arrangement senses a form identifier, the arrangement may again prompt the user at one or more instances until the arrangement senses a form identifier.

As the form identifier can be embodied in any of a number of different manners, it should be appreciated that the pen-enabled computing arrangement can be operated to sense the identifier in any of a number of different manners. As shown more particularly in FIG. 5, for example, the pen-enabled computing arrangement can be operated to sense the identifier by using the digital pen 12 to mark through the form-identification area 116, or more particularly, the concatenated regions 117 within the identification area that correspond to characters of the identifier, as shown in block 202. By marking through the concatenated regions, the digital pen creates a continuous marking beginning with the commencement of contact or other interaction between the digital pen and the printed paper 160 and terminating with the removal of the digital pen from the printed paper, thereby capturing electronic handwriting input defining a stroke 180 across the concatenated regions, as shown in FIG. 5 and FIG. 10a. Continuing the barcode analogy above where the concatenated regions functionally operate in a manner similar to a barcode, then, the digital pen may operate in a manner similar to a barcode reader scanning a barcode.

As the digital pen 12 is operated to mark through the concatenated regions 117, or otherwise operated to generally mark on the printed paper 160, the handwriting capture interface 20 captures and provides a series of data points, typically represented by X, Y coordinate points, representative of the position of the digital pen 12, or more particularly the writing stylus embodied by the digital pen, at a plurality of successive instances in time. The series of data points then define the respective stroke 180. When the position of the digital pen is determined based upon a pattern of dots or other markings, the X, Y coordinate points are referenced to a particular pattern. In this regard, as the digital pen marks through each predefined region 117 in the form-identification area 116, the series of X, Y coordinate points are referenced to the particular region of the identification pattern 147 from which the predefined region originated, where the series of X, Y coordinate points may be considered analogous to encoded data from barcodes. Thus, for a series of concatenated regions $117_4$, $117_1$, $117_6$ and $117_3$ (corresponding to identifier "4163") within the form-identification area, the series of data points includes data points defining portions of a stroke 180a, 180b, 180c and 180d, respectively, through the respective regions of the identification pattern, as shown in FIG. 10b. As indicated above, the regions are typically separated by a threshold distance. Accordingly, the data points jump from one region to the next, thereby defining a discontinuity (represented by dashed lines 181) in the series of data points having a length at least as long as the threshold distance.

Further, it should be appreciated that, as the digital pen 12 is operated to mark through the concatenated regions 117 in the form-identification area 116, the stroke 180 may extend beyond the regions themselves. Thus, in addition to portions of the stroke 180a-180d referenced to respective regions of the identification pattern 147, the stroke may include X, Y coordinate points referenced to the background pattern 16 associated with the form. More particularly, as shown in FIG. 10c, the stroke may include X, Y coordinate points defining portions of the stroke 180e and/or 180f on the background pattern.

Before or after the pen-enabled computing arrangement 10 successfully senses the form identifier, or more particularly the X, Y coordinate pairs of the regions 117 associated with the form identifier, the user may interact with the arrangement to effectuate the creation of a contextual electronic message or forms processing by the arrangement. Generally, the user interacts with the form according to the user-identified function imparted by the visual identifiers 122 of the respective form, again referring to FIG. 3. In this regard, the user typically inputs data within the separate fields according to the functions thereof, as shown in block 204. The user may additionally input data outside the fields of the form, however, particularly if the data comprises free-form handwriting input.

Typically, as the data is input into a field, it is spatially referenced with respect to the box defining the field based upon the background pattern 16 associated with the respective form. For example, data input into a "Name" field may be referenced to that field based upon coordinate points defining the "Name" field, and the coordinate points defining the strokes or other data input into the "Name" field. Thereafter, data input into an "Address" field may be referenced to that field based upon coordinate points defining the "Address" field, and the coordinate points defining the strokes or other data input into the "Address" field. Further details of the interaction between the pen-enabled computing arrangement 10 and a preprinted form, according to some embodiments, are found in U.S. patent application Ser. No. 09/540,469 to Clary, entitled System, Computer Program Product, Computing Device, and Associated Methods for Form Identification and Information Manipulation, filed Mar. 31, 2000, and U.S. patent application Ser. No. 10/059,478 to Brooks et al., entitled System, Computer Program Product, and Method for Capturing and Processing Form Data, filed Jan. 29, 2002, the contents of both of which are hereby incorporated by reference in its entirety.

As, or more typically after, the user inputs data relative to the fields of the preprinted form 160, the computer program product 28 of the digital pen and/or computing system 14 is capable of assessing and separately processing the input data. Before assessing and processing the input data (and at any time after capturing the stroke 180 through the regions 117 of the form-identification area 116), however, the computer program product may determine the form identifier based upon the series of data points of the stroke through the form-identification area. As indicated above, as the digital pen marks through each predefined region in the form-identification area, the series of X, Y coordinate points are referenced to the particular region of the identification pattern 147 from which the predefined region originated. Thus, the stroke includes a portion (e.g., 180a, 180b, 180c and 180d) for each region of the series of concatenated regions (e.g., $117_4$, $117_1$, $117_6$ and $117_3$ for identifier "4163").

Accordingly, the computer program product 28 of one embodiment determines the form identifier by determining the regions 117 of the identification pattern 147 to which the points defining the portions of the stroke 180 are referenced, as shown in block 206. Thus, for example, the computer program product can determine that portion 180a of the stroke is referenced to region $117_4$ of the identification pattern, portion 180b is referenced to region $117_1$, portion 180c is referenced to region $117_6$, and portion 180d is referenced to region $117_3$. If necessary, the computer program product may be configured to distinguish one region from another based upon the discontinuity 181 between data points of consecutive regions. Further, the computer program product may be configured to identify the first and last regions based upon the first and last data points referenced to the identification pattern 147. Irrespective of how the computer program product determines the regions to which the points defining the portions of the stroke are referenced, however, the computer program product can then determine the characters associated with the determined regions, where those characters form the form identifier, as shown in block 208. Continuing the above example, then, when the computer program product determines that portions of the stroke are referenced to regions $117_4$, $117_1$, $117_6$ and $117_3$, the computer program product can determine that the form identifier includes the numbers "4," "1" "6," and "3."

Thereafter, the computer program product can form the form identifier (e.g., "4163") by concatenating the determined characters together, as shown in block 210. Typically, the portions of the stroke 180 are captured in the order the respective characters appear in the form identifier, such as from left to right (or top to bottom if the regions 117 are so concatenated). In such instances, the determined characters can be concatenated to form the identifier in the order in which the handwriting capture interface 20 captures the respective portions of the stroke. It should be understood, however, that in instances where the portions of the stroke are captured in an order opposite from the order the respective characters appear in the form identifier, the computer program product may be configured to identify the opposite ordering, and accordingly concatenate the characters in the proper order to form the form identifier. This is because the stroke data is ordered, thus the direction of digital pen motion during the identifier sensing stroke can be computed and the identifier characters arranged accordingly.

Irrespective of exactly how or when the form identifier is determined based upon the stroke 180 through the regions 117 in the form-identification area, the computer program product 28 of the digital pen 12 and/or computing system 14 is capable of assessing and separately processing the input data based upon the determined form identifier including, for example, associating the input data with the form identifier, as shown in block 212. In addition, if so desired, the computer program product may assess and separately process the input data based upon the type of input, whether free-form handwriting input, handwriting input for character recognition, checkbox or radio button data, or some other form of input data. In this regard, when the handwriting input corresponds to that for character recognition, the computer program product may also convert or translate the handwriting input into text form using, for example, an automatic on-line handwriting recognizer or other translation system. However, in other embodiments, the handwriting input may be stored and further utilized without conversion into text, such as wherein the handwriting input corresponds to free-form handwriting, for example.

Additionally, or alternatively, the computer program product 28 may compress the handwriting input for easier storage, processing and/or transmission, particularly where the handwriting input is free-form handwriting and may comprise a large number of electronic ink data points. Such compression is described in further detail in U.S. Pat. No. 6,741,749 entitled System, Device, Computer Program Product and Method for Representing a Plurality of Electronic Ink Data Points, issued May 25, 2004, assigned to Advanced Digital Systems, Inc., and hereby incorporated by reference in its entirety. In still further instances, the handwriting input, whether free-form or for character recognition, may be stored in its original form, in addition to possibly being converted to text form and stored by the computer program product, wherein either form, or both forms, of the handwriting input may be further utilized by the pen-enabled computing arrangement 10.

In instances in which the input data corresponds to checkbox or radio button selections, the computer program product 28 of the digital pen 12 or computing system 14 can store the result of whether the checkbox has been checked or the radio button has been selected based on the spatial coordinates of the handwritten input and rules of logical exclusion or inclusion. If, after a checkbox or radio button has been selected, the user makes a new mark on the checkbox or radio button, the pen-enabled computing arrangement 10 can provide feedback to the user, such as visual and/or audio or speech synthesis, to indicate that a selected checkbox or radio button as been reselected. Making a new mark in the checkbox and or radio button can also toggle the state of the stored result. For example, an additional mark on a selected checkbox causes that checkbox to be deselected. Alternatively, the new mark can select again a previously selected checkbox or radio button to thereby add to the previous selection, such as in cases where each checkbox mark increments a count of the number of times the user has selected the checkbox. In embodiments where the new mark selects a previously selected checkbox or radio button again, the checkbox or radio button can be deselected, or "scratched-out," with at least one stroke over the checkbox or radio button. Thus, adding to or changing a selection can allow the state of the stored result to be consistent with the visual feedback on the preprinted form and/or the display 36 of the computing system.

Some embodiments of the present invention may also allow the data fields to be alterable by the user. For example, the present invention may allow the user to alter a field for free-form handwriting into a field for handwriting for character recognition, and vice versa. In addition, the computer program product 28 of the digital pen 12 and/or computing system 14 may have the ability to time and/or date stamp any data entries as they are input into the pen-enabled computing arrangement 10. The processing element 22 of the digital pen and/or computing system is then able to process these data fields with respect to the time and/or date stamp tags. As these functions are executed, the computer program product also controls the user interface such that information relevant to ongoing digital pen 12 or computing system activities can be displayed for the user, as described below. The digital pen and/or the computing system may provide aural, vibration and/or visual information to the user, including, for example audio tones or waveforms or speech synthesized voice messages or associated displays. In a particularly advantageous embodiment, the computer program product is also capable of formatting, sending, receiving, and interpreting messages received, such as via the communication interface 30 and/or a RF transceiver. Further details regarding use of the pen-enabled computing arrangement 10, according to some embodiments, are found in the aforementioned U.S. patent application Ser. No. 11/036,534.

In addition to or in lieu of associating the user input with a desired form by means of a form identifier, user input can be associated with one or more other objects by means of respective identifiers associated with those objects. For example, the pen-enabled computing arrangement can be adapted to associate user input with one or more database records, entries or the like based upon sensing identifiers associated with those objects. In such instances, the pen-enabled computing arrangement 10 may or may not interact with a preprinted form. In lieu of a preprinted form, then, the pen enabled computing arrangement may directly interact with a handwriting capture interface 20, or may interact with the handwriting capture interface by means of a writing surface 18 embodied by blank paper or paper having information related to a respective object preprinted thereon.

As explained above, user input can be associated with an object by means of an identifier associated with that object. It should be understood, however, that the user input can similarly be associated with an object by means of more than one identifier associated with that object, or be associated with more than one object by means of one or more identifiers associated with those objects. For example, presume that a database record (i.e., object) has an associated record identifier, and that the database record can store user input related to one or more of three forms (i.e., objects) that each have an associated identifier. In such an instance, user input may be associated with the database record and/or one or more of the three forms. To this end, a preprinted form may include more than one identification area, one for sensing the record identifier and another for sensing a form identifier. Alternatively, a unique background pattern for each of the three forms can be used to function as the form (type) identifier, with the record identifier being sensed via the form-identification area.

As also explained above, the form-identification area 116 includes regions 117 of an identification pattern 147, where the regions correspond to characters of a form identifier. It should be understood, however, that the form identification area can include regions from more than one identification pattern, if so desired. Also, the form identification area can include regions from more than one page of one or more identification patterns. In such instances, the system and method may operate in a manner similar to before, with the computer program product determining the form identifier based upon portions of a stroke 180 captured with reference to regions of more than one identification pattern, or regions of more than one page of one or more identification patterns.

In one advantageous embodiment, portions of the system and method of the present invention, such as portions of the digital pen 12 and computing system 14 include a computer program product 28. The computer program product includes a computer-readable storage medium, such as the non-volatile storage medium, and computer-readable program code portions, such as a series of computer instructions, embodied in the computer-readable storage medium for receiving the handwritten data and associated data and for subsequently processing and transmitting the handwritten data as described hereinabove. Typically, the computer program is stored by the processing element or a related memory device, such as the non-volatile storage device 26 as depicted in FIG. 2.

In this regard, FIGS. 1, 2, 6, 7 and 9 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

To further illustrate various advantages of exemplary embodiments of the present invention, consider a book of traffic citation forms, where the citations are numbered in accordance with a "book and set" numbering scheme. In accordance with such a scheme, each citation has an identifier including a common portion identifying the particular book, and a unique portion (e.g., 01, 02, 03, 04, etc.) identifying the particular citation in the book. Each citation, then, includes a form-identification area 116 with concatenated regions 117 corresponding to characters of the identifier, and may also include a corresponding human-readable version of the identifier. Thus, for example, presume that an officer carrying citation book 4163 issues traffic citation 05 to a particular traffic offender such that the particular traffic citation is associated with the identifier 4163-05.

Also consider that the officer carries a digital pen 12 such that, when the officer decides to issue the traffic citation, and thus complete the form for traffic citation 4163-05, the officer initiates the digital pen to initiate processing the traffic citation (see FIG. 9, block 200). After initiating operation of the digital pen, the officer uses the digital pen to mark through the concatenated regions 117 within the form-identification area 116 of traffic citation 4163-05 (i.e., $117_4$, $117_1$, $117_6$, $117_3$, $117_0$ and $117_5$) (see block 202). As the digital pen marks through the concatenated regions, the digital pen captures coordinate points referenced to respective regions of the identification pattern 147 from which the regions originated. Accordingly, the coordinate points may be considered analogous to encoded data from barcodes.

After marking through the concatenated regions 117 within the form-identification area 116 of citation 4163-05, the officer uses the digital pen 12 to input data within a number of fields of the citation, such as the offender's contact information and information related to the offense (see block 204). As the officer inputs data into the fields, the digital pen captures input data that is spatially referenced with respect to the respective fields based upon a background pattern 16 preprinted on the citation. Then, after completing the citation, the digital pen processes the captured coordinate points referenced to the identification pattern 147, as well as the input data referenced to the background pattern. More particularly, the officer can control the digital pen to upload the coordinate points and input data to a computing system 14 at the police station, such as by docking the digital pen to a cradle 13 coupled to the computing system. The computing system can then determine the citation form identifier (i.e., 4163-05) based upon the captured coordinate points referenced to the identification pattern (see blocks 206, 208 and 210). The computing system can then process the input data (referenced to the background pattern) based upon the determined form identifier including, for example, associating the input data with the form identifier in memory (see block 212). At some later time, then, the same or a different computing system can further process and more permanently store the processed input data.

Therefore, the system, computer program product and method of exemplary embodiments of the present invention provide identification pattern(s) 147 that include regions 117 associated with characters from which one or more form identifiers may be formed. The form identifier can accordingly be determined by using the digital pen 12 to mark through the regions such that a stroke 180 can be captured that includes portions referenced to the respective regions of the identification patterns. The form identifier can then be determined based upon those portions of the stroke. In this manner, the concatenated regions and digital pen operate in a manner similar to a barcode encoding the form identifier, and barcode reader configured to read the barcode and determine the form identifier therefrom. More particularly, the concatenated regions corresponding to characters of a form identifier may function in a manner similar to the sequence of vertical bars and spaces a typical barcode that represent numbers and other symbols of data encoded therein. The digital pen may then operate in a manner similar to a barcode reader that scans a barcode by capturing a stroke across the regions. The computer program product 28 then decodes the captured stroke into the form identifier by identifying the regions of the identification pattern to which portions of the stroke correspond, and the characters associated with the respective regions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for capturing an identifier, the system comprising:
    a capture interface configured to capture an electronic input defining a stroke through a plurality of concatenated regions, wherein each of the concatenated regions corresponds to a region of at least one identification pattern from which a position of a writing stylus on the at least one identification pattern is determinable, wherein the at least one identification pattern comprises a plurality of discontinuous regions each of which has a predetermined association with a character of an identifier associated with an object, wherein the identifier includes a modulus number with a character comprising a check digit, and wherein the stroke includes a plurality of portions through the concatenated regions such that each portion is referenced to a respective region of the identification pattern; and
    at least one processor in communication with the capture interface, wherein the processor is configured to determine the identifier based upon the regions of the at least one identification pattern to which portions of the stroke are referenced, and based upon the characters of the identifier associated with the respective regions, and
    wherein the at least one processor being configured to determine the identifier includes being configured to identify the check digit, and determine if the identifier is known and proper based upon the identified check digit.

2. A system according to claim 1, wherein the processor being configured to determine the identifier includes being configured to determine the regions of the identification pattern to which portions of the stroke are referenced, determine the characters associated with the determined regions of the identification pattern, and thereafter concatenate the determined characters to form the identifier.

3. A system according to claim 1, wherein the capture interface is configured to capture electronic handwriting input as the writing stylus marks through the concatenated regions of a printed paper.

4. A system according to claim 3, wherein the capture interface is configured to capture an electronic input based upon a position of the writing stylus with respect to the printed paper, the printed paper having a background pattern printed thereon.

5. A system according to claim 1 further comprising:
    at least one computing arrangement configured to provide the plurality of concatenated regions, including being configured to:
    divide at least one identification pattern into a plurality of discontinuous regions, the identification pattern comprising a pattern of markings from which a position of a writing stylus on the identification pattern is determinable;
    associate each region with a character;
    select an identifier comprising a plurality of characters, wherein each character of the identifier is associated with a region of the identification pattern;
    concatenate the regions of the identification pattern that are associated with the characters of the identifier;
    associate the concatenated regions with an object to thereby associate the identifier with the object; and
    provide the concatenated regions associated with the object.

6. A system according to claim 1 further comprising a pen-enabled computing arrangement which comprises the capture interface and at least one processor, and wherein the capture interface comprises a handwriting capture interface.

7. A system according to claim 6 wherein the handwriting capture interface is configured to capture an electronic handwriting input based upon a position of the writing stylus with reference to a background pattern.

8. A system according to claim 1 wherein the processor is also configured to associate the electronic input with the determined identifier to thereby associate the electronic input with the object associated with the identifier.

9. A system comprising:
    at least one computing arrangement including a processor configured to divide an identification pattern into a plurality of discontinuous regions, the identification pattern comprising a pattern of markings from which a position of a writing stylus on the identification pattern is determinable,
    wherein the processor is configured to associate each region with a character, select an identifier comprising a plurality of characters, wherein the identifier includes a modulus number with a character comprising a check digit, wherein each character of the identifier is associated with a region of the identification pattern, and wherein the processor is configured to concatenate the regions of the identification pattern that are associated with the characters of the identifier,
    wherein the computing arrangement is configured to associate the concatenated regions with an object to thereby associate the identifier with the object, and wherein the concatenated regions are associated with the object such that the associated identifier is determinable based upon the concatenated regions and the regions of the identification pattern to which the concatenated regions correspond, the identifier being determinable including the check digit being identifiable, and the identifier being determinable as known and proper based upon the identified check digit.

10. A system according to claim 9 further comprising:
    a pen-enabled computing arrangement, wherein the pen-enabled computing arrangement comprises:
    a handwriting capture interface configured to capture an electronic handwriting input defining a stroke through the concatenated regions, wherein the stroke includes a plurality of portions through the concatenated regions such that each portion is referenced to a respective region of the identification pattern, and wherein the handwriting capture interface is also configured to capture an electronic handwriting input based upon a position of the writing stylus with reference to a background pattern; and
    at least one processor in communication with the handwriting capture interface, wherein the processor is configured to determine the identifier based upon the regions of the identification pattern to which portions of the stroke are referenced, and based upon the characters of the identifier associated with the respective regions, and wherein the processor is configured to associate the electronic handwriting input with the determined identifier to thereby associate the electronic handwriting input with the object associated with the identifier.

11. A system according to claim 10, wherein the processor being configured to determine the identifier includes being configured to determine the regions of the identification pattern to which portions of the stroke are referenced, determine the characters associated with the determined regions of the identification pattern, and thereafter concatenate the determined characters to form the identifier.

12. A system according to claim 10, wherein the handwriting capture interface is configured to capture an electronic handwriting input as the writing stylus marks through the concatenated regions of a printed paper, and wherein the handwriting capture interface is configured to capture an electronic handwriting input based upon a position of the writing stylus with respect to the printed paper, the printed paper having the position-determining pattern printed thereon.

13. A method of capturing an identifier, the method comprising:

capturing, by a capture interface, an electronic input defining a stroke through a plurality of concatenated regions, wherein each of the concatenated regions corresponds to a region of at least one identification pattern from which a position of a writing stylus on the at least one identification pattern is determinable, wherein the identification pattern comprises a plurality of discontinuous regions each of which has a predetermined association with a character of an identifier associated with an object, wherein the identifier includes a modulus number with a character comprising a check digit, and wherein the stroke includes a plurality of portions through the concatenated regions such that each portion is referenced to a respective region of the identification pattern; and determining, by a processor in communication with the capture interface, the identifier based upon the regions of the identification pattern to which portions of the stroke are referenced, and based upon the characters of the identifier associated with the respective regions, and wherein determining the identifier includes identifying the check digit, and determining if the identifier is known and proper based upon the identified check digit.

14. A method according to claim 13, wherein determining the identifier comprises:

determining the regions of the identification pattern to which portions of the stroke are referenced;
determining the characters associated with the determined regions of the identification pattern; and
concatenating the determined characters to form the identifier.

15. A method according to claim 13 further comprising:
receiving printed paper including the concatenated regions; and
wherein capturing an electronic input comprises marking through the concatenated regions of the printed paper to thereby capture the electronic input.

16. A method according to claim 15, wherein capturing an electronic input comprises capturing an electronic input based upon a position of the writing stylus with respect to the printed paper, the printed paper having a background pattern printed thereon.

17. A method according to claim 13 further comprising:
providing a plurality of concatenated regions before capturing electronic input defining a stroke therethrough, wherein the providing step comprises:
dividing an identification pattern into a plurality of discontinuous regions, the identification pattern comprising a pattern of markings from which a position of a writing stylus on the identification pattern is determinable;
associating each region with a character;
selecting an identifier comprising a plurality of characters, wherein each character of the identifier is associated with a region of the identification pattern;
concatenating the regions of the identification pattern that are associated with the characters of the identifier;
associating the concatenated regions with an object to thereby associate the identifier with the object; and
providing the concatenated regions associated with the object.

18. A method according to claim 13 further comprising capturing an electronic handwriting input based upon a position of the writing stylus with reference to a background pattern.

19. A method according to claim 13 further comprising associating the electronic input with the determined identifier to thereby associate the electronic input with the object associated with the identifier.

20. A method comprising:
dividing an identification pattern into a plurality of discontinuous regions, the identification pattern comprising a pattern of markings from which a position of a writing stylus on the identification pattern is determinable;
associating each region with a character;
selecting an identifier comprising a plurality of characters, wherein the identifier includes a modulus number with a character comprising a check digit, and wherein each character of the identifier is associated with a region of the identification pattern;
concatenating the regions of the identification pattern that are associated with the characters of the identifier; and
associating the concatenated regions with an object to thereby associate the identifier with the object, wherein the concatenated regions are associated with the object such that the associated identifier is determinable based upon the concatenated regions and the regions of the identification pattern to which the concatenated regions correspond, the identifier being determinable including the check digit being identifiable, and the identifier being determinable as known and proper based upon the identified check digit,
wherein dividing an identification pattern into a plurality of regions, associating each region with a character, selecting an identifier, concatenating the regions, and associating the concatenated regions with an object are performed by a computing arrangement including a processor configured to divide an identification pattern into a plurality of regions, associate each region with a character, select an identifier, concatenate the regions, and associate the concatenated regions with an object.

21. A method according to claim 20 further comprising:
capturing an electronic handwriting input defining a stroke through the concatenated regions, wherein the stroke includes a plurality of portions through the concatenated regions such that each portion is referenced to a respective region of the identification pattern;

capturing an electronic handwriting input based upon a position of the writing stylus with reference to a position-determining pattern;

determining the identifier based upon the regions of the identification pattern to which portions of the stroke are referenced, and based upon the characters of the identifier associated with the respective regions; and associating the electronic handwriting input with the determined identifier to thereby associate the electronic handwriting input with the object associated with the identifier.

22. A method according to claim 21, wherein determining the identifier comprises:

determining the regions of the identification pattern to which portions of the stroke are referenced;

determining the characters associated with the determined regions of the identification pattern; and concatenating the determined characters to form the identifier.

23. A method according to claim 21 further comprising:

receiving printed paper including the concatenated regions; and wherein capturing an electronic handwriting input comprises marking through the concatenated regions of the printed paper to thereby capture the electronic handwriting input.

24. A method according to claim 23, wherein capturing an electronic handwriting input comprises capturing an electronic handwriting input based upon a position of the writing stylus with respect to the printed paper, the printed paper having a background pattern printed thereon.

25. A computer program product for capturing an identifier, the computer program product comprising at least one computer-readable storage medium having computer-readable program code portions stored therein, the computer-readable program code portions comprising:

a first executable portion for receiving an electronic input that has been captured to thereby define a stroke through a plurality of concatenated regions, wherein each of the concatenated regions corresponds to a region of at least one identification pattern from which a position of a writing stylus on the at least one identification pattern is determinable, wherein the identification pattern comprises a plurality of discontinuous regions each of which has a predetermined association with a character of an identifier associated with an object, wherein the identifier includes a modulus number with a character comprising a check digit, and wherein the stroke includes a plurality of portions through the concatenated regions such that each portion is referenced to a respective region of the identification pattern; and a second executable portion for determining the identifier based upon the regions of the identification pattern to which portions of the stroke are referenced, and based upon the characters of the identifier associated with the respective regions, and wherein the second executable portion is configured to determine the identifier including being configured to identify the check digit, and determine if the identifier is known and proper based upon the identified check digit.

26. A computer program product according to claim 25, wherein the second executable portion is adapted to determine the identifier by determining the regions of the identification pattern to which portions of the stroke are referenced, determining the characters associated with the determined regions of the identification pattern, and thereafter concatenating the determined characters to form the identifier.

27. A computer program product according to claim 25, wherein the first executable portion is adapted to receive an electronic input as or after the writing stylus marks through the concatenated regions of a printed paper to thereby capture the electronic input.

28. A computer program product according to claim 27 further comprising a third executable portion for receiving an electronic handwriting input captured based upon the position of the writing stylus with reference to a background pattern.

29. A computer program product according to claim 28, wherein the third executable portion is adapted to receive an electronic handwriting input captured based upon a position of the writing stylus with respect to the printed paper, the printed paper having the position-determining pattern printed thereon.

30. A computer program product according to claim 25 further comprising a third executable portion for associating the electronic input with the determined identifier to thereby associate the electronic input with the object associated with the identifier.

31. A computer program product according to claim 25 further comprising:

a fifth executable portion for providing a plurality of concatenated regions before capturing electronic input defining a stroke therethrough, wherein the fifth executable portion is adapted to provide the concatenated regions by:

selecting an identifier comprising a plurality of characters, wherein each character of the identifier is associated with a region of an identification pattern that is divided into a plurality of discontinuous regions that are each associated with a character, wherein the identification pattern comprises a pattern of markings from which a position of a writing stylus on the identification pattern is determinable;

concatenating the regions of the identification pattern that are associated with the characters of the identifier;

associating the concatenated regions with an object to thereby associate the identifier with the object; and providing the concatenated regions associated with the object.

32. A computer program product comprising at least one computer-readable storage medium having computer-readable program code portions stored therein, the computer-readable program code portions comprising:

a first executable portion for dividing an identification pattern into a plurality of discontinuous regions, the identification pattern comprising a pattern of markings from which a position of a writing stylus on the identification pattern is determinable;

a second executable portion for associating each region with a character;

a third executable portion for selecting an identifier comprising a plurality of characters, wherein the identifier includes a modulus number with a character comprising a check digit, and wherein each character of the identifier is associated with a region of the identification pattern;

a fourth executable portion for concatenating the regions of the identification pattern that are associated with the characters of the identifier; and a fifth executable portion for associating the concatenated regions with an object to thereby associate the identifier with the object, wherein the concatenated regions are associated with the object such that the associated identifier is determinable based upon the concatenated regions and the regions of the identification pattern to which the concatenated regions correspond, the identifier being determinable including the check digit being identifiable, and the identifier being determinable as known and proper based upon the identified check digit.

33. A computer program product according to claim 32 further comprising:
    a sixth executable portion for receiving an electronic input captured to thereby define a stroke through the concatenated regions, wherein the stroke includes a plurality of portions through the concatenated regions such that each portion is referenced to a respective region of the identification pattern;
    a seventh executable portion for determining the identifier based upon the regions of the identification pattern to which portions of the stroke are referenced, and based upon the characters of the identifier associated with the respective regions; and
    an eighth executable portion for associating the electronic input with the determined identifier to thereby associate the electronic input with the object associated with the identifier.

34. A computer program product according to claim 33, wherein the seventh executable portion is adapted to determine the identifier by determining the regions of the identification pattern to which portions of the stroke are referenced, determining the characters associated with the determined regions of the identification pattern, and thereafter concatenating the determined characters to form the identifier.

35. A computer program product according to claim 33, wherein the sixth executable portion is adapted to receive an electronic input as or after the writing stylus marks through the concatenated regions of a printed paper to thereby capture the electronic input.

36. A computer program product according to claim 33 further comprising a ninth executable portion for receiving an electronic handwriting input captured based upon a position of the writing stylus with reference to a background pattern.

37. A computer program product according to claim 36 wherein the ninth executable portion is adapted to receive an electronic handwriting input captured based upon a position of the writing stylus with respect to the printed paper, the printed paper having the position-determining pattern printed thereon.

38. A system according to claim 1, wherein each of the plurality of discontinuous regions has a predetermined association with a character of one or more of a plurality of identifiers associated with a respective plurality of objects, one of the objects comprising a database record, and one or more others of the objects comprising one or more forms of the database record, and
    wherein the at least one processor being configured to determine the identifier includes being configured to determine the database record identifier and form identifier for one of the forms of the database record based upon the regions of the at least one identification pattern to which portions of the stroke are referenced, and based upon the characters of the database record identifier and respective form identifier associated with the respective regions.

* * * * *